United States Patent
Van der Merwe et al.

(10) Patent No.: US 9,432,258 B2
(45) Date of Patent: Aug. 30, 2016

(54) METHODS AND APPARATUS TO CONFIGURE VIRTUAL PRIVATE MOBILE NETWORKS TO REDUCE LATENCY

(75) Inventors: Jacobus Van der Merwe, New Providence, NJ (US); Xu Chen, Ann Arbor, MI (US); Baris Coskun, Brooklyn, NY (US); Gustavo de los Reyes, Fair Haven, NJ (US); Seungjoon Lee, Basking Ridge, NJ (US); Suhas Mathur, Edison, NJ (US); Arati Baliga, Edison, NJ (US); Gang Xu, Piscataway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 626 days.

(21) Appl. No.: 13/154,121

(22) Filed: Jun. 6, 2011

(65) Prior Publication Data
US 2012/0311107 A1    Dec. 6, 2012

(51) Int. Cl.
| | |
|---|---|
| G06F 15/177 | (2006.01) |
| H04L 12/24 | (2006.01) |
| H04L 12/801 | (2013.01) |
| H04L 29/08 | (2006.01) |
| H04L 12/26 | (2006.01) |
| H04L 12/927 | (2013.01) |
| H04L 29/06 | (2006.01) |
| H04L 12/46 | (2006.01) |

(52) U.S. Cl.
CPC ......... *H04L 41/083* (2013.01); *H04L 12/4633* (2013.01); *H04L 43/087* (2013.01); *H04L 43/16* (2013.01); *H04L 47/14* (2013.01); *H04L 47/805* (2013.01); *H04L 65/80* (2013.01); *H04L 67/322* (2013.01)

(58) Field of Classification Search
CPC ..... H04L 47/14; H04L 47/805; H04L 65/80; H04L 43/0852; H04L 43/0876; H04L 41/0896; H04L 43/16; H04L 63/0272; H04L 12/4633; H04L 12/4641; H04L 67/322; H04L 43/087
USPC ......................................... 709/220
See application file for complete search history.

(56) References Cited

U.S. PATENT DOCUMENTS

| | | |
|---|---|---|
| 5,345,502 A | 9/1994 | Rothenhofer |
| 5,475,819 A | 12/1995 | Miller et al. |

(Continued)

OTHER PUBLICATIONS

A. X. Liu and F. Chen, "Privacy Preserving Collaborative Enforcement of Firewall Policies in Virtual Private Networks," in IEEE Transactions on Parallel and Distributed Systems, vol. 22, No. 5, pp. 887-895, May 2011.*

(Continued)

*Primary Examiner* — Taylor Elfervig
(74) *Attorney, Agent, or Firm* — Hanley, Flight & Zimmerman, LLC

(57) ABSTRACT

Methods and apparatus to configure virtual private mobile networks for latency are disclosed. A disclosed example method includes provisioning logically a virtual private mobile network within a wireless network to reduce latency of a communication associated with a latency sensitive application, determining a mobile device is communicatively coupling to the wireless network via the latency sensitive application, and coupling the mobile device to the virtual private mobile network to reduce latency of the communication associated with the latency sensitive application.

19 Claims, 9 Drawing Sheets

(56) References Cited

U.S. PATENT DOCUMENTS

| | | |
|---|---|---|
| 5,623,601 A | 4/1997 | Vu |
| 6,016,318 A | 1/2000 | Tomoike |
| 6,029,067 A | 2/2000 | Pfundstein |
| 6,058,426 A | 5/2000 | Godwin et al. |
| 6,079,020 A | 6/2000 | Liu |
| 6,205,488 B1 | 3/2001 | Casey et al. |
| 6,781,982 B1 | 8/2004 | Borella et al. |
| 6,880,002 B2 | 4/2005 | Hirschfeld et al. |
| 6,885,864 B2 | 4/2005 | McKenna et al. |
| 6,891,842 B2 | 5/2005 | Sahaya et al. |
| 6,954,790 B2 | 10/2005 | Forslow |
| 6,976,177 B2 | 12/2005 | Ahonen |
| 6,990,666 B2 | 1/2006 | Hirschfeld et al. |
| 7,072,346 B2 | 7/2006 | Hama |
| 7,075,933 B2 | 7/2006 | Aysan |
| 7,126,921 B2 | 10/2006 | Mark et al. |
| 7,131,141 B1 | 10/2006 | Blewett et al. |
| 7,185,106 B1 | 2/2007 | Moberg et al. |
| 7,221,675 B2 | 5/2007 | Bryden et al. |
| 7,225,270 B2 | 5/2007 | Barr et al. |
| 7,292,575 B2 | 11/2007 | Lemieux et al. |
| 7,340,519 B1 | 3/2008 | Golan et al. |
| 7,366,188 B2 | 4/2008 | Kim |
| 7,388,844 B1 | 6/2008 | Brown et al. |
| 7,400,611 B2 | 7/2008 | Mukherjee et al. |
| 7,415,627 B1 | 8/2008 | Radhakrishnan et al. |
| 7,738,891 B2 | 6/2010 | Tenhunen et al. |
| 7,769,036 B2 | 8/2010 | Sorge et al. |
| 8,380,863 B2 | 2/2013 | Natarajan et al. |
| 8,458,787 B2 | 6/2013 | Wei et al. |
| 8,509,169 B2 | 8/2013 | Van Der Merwe et al. |
| 2002/0172148 A1* | 11/2002 | Kim .................. H04L 12/14 370/216 |
| 2002/0181477 A1 | 12/2002 | Mo et al. |
| 2003/0051021 A1 | 3/2003 | Hirschfeld et al. |
| 2003/0147403 A1* | 8/2003 | Border et al. ........... 370/395.53 |
| 2003/0188001 A1 | 10/2003 | Eisenberg et al. |
| 2004/0073642 A1 | 4/2004 | Iyer |
| 2004/0148439 A1 | 7/2004 | Harvey et al. |
| 2005/0071508 A1* | 3/2005 | Brown et al. ................. 709/246 |
| 2005/0138204 A1 | 6/2005 | Iyer et al. |
| 2006/0068845 A1* | 3/2006 | Muller et al. ................. 455/558 |
| 2006/0083205 A1 | 4/2006 | Buddhikot et al. |
| 2006/0111113 A1 | 5/2006 | Waris |
| 2006/0168279 A1 | 7/2006 | Lee et al. |
| 2006/0168321 A1 | 7/2006 | Eisenberg et al. |
| 2006/0242305 A1* | 10/2006 | Alnas ............................ 709/227 |
| 2006/0251088 A1 | 11/2006 | Thubert et al. |
| 2006/0268901 A1 | 11/2006 | Choyi et al. |
| 2007/0039047 A1 | 2/2007 | Chen et al. |
| 2007/0070914 A1* | 3/2007 | Abigail ......................... 370/252 |
| 2007/0105548 A1 | 5/2007 | Mohan et al. |
| 2007/0140250 A1 | 6/2007 | McAllister et al. |
| 2007/0140251 A1 | 6/2007 | Dong |
| 2007/0195800 A1 | 8/2007 | Yang et al. |
| 2007/0213050 A1 | 9/2007 | Jiang |
| 2007/0217419 A1 | 9/2007 | Vasseur |
| 2007/0232265 A1 | 10/2007 | Park et al. |
| 2007/0271606 A1* | 11/2007 | Amann et al. ................. 726/15 |
| 2007/0280241 A1 | 12/2007 | Verma |
| 2008/0002697 A1 | 1/2008 | Anantharamaiah et al. |
| 2008/0022094 A1 | 1/2008 | Gupta et al. |
| 2008/0034365 A1 | 2/2008 | Dahlstedt |
| 2008/0049752 A1 | 2/2008 | Grant |
| 2008/0080396 A1 | 4/2008 | Meijer et al. |
| 2008/0080517 A1 | 4/2008 | Roy et al. |
| 2008/0080552 A1 | 4/2008 | Gates et al. |
| 2008/0082546 A1 | 4/2008 | Meijer et al. |
| 2008/0148341 A1 | 6/2008 | Ferguson et al. |
| 2009/0006603 A1 | 1/2009 | Duponchel et al. |
| 2010/0017861 A1* | 1/2010 | Krishnaswamy ..... H04W 48/18 726/7 |
| 2010/0039978 A1 | 2/2010 | Rangan |
| 2010/0111093 A1 | 5/2010 | Satterlee et al. |
| 2010/0186024 A1 | 7/2010 | Eker et al. |
| 2010/0284343 A1 | 11/2010 | Maxwell et al. |
| 2011/0007690 A1 | 1/2011 | Chang et al. |
| 2011/0026468 A1* | 2/2011 | Conrad et al. ................. 370/329 |
| 2011/0142053 A1 | 6/2011 | Van Der Merwe et al. |
| 2011/0154101 A1 | 6/2011 | Merwe et al. |
| 2011/0177790 A1* | 7/2011 | Monte et al. ............... 455/404.2 |
| 2011/0302630 A1 | 12/2011 | Nair et al. |
| 2012/0005745 A1 | 1/2012 | Wei et al. |
| 2012/0106565 A1* | 5/2012 | Yousefi et al. ................. 370/402 |
| 2012/0208506 A1 | 8/2012 | Hirano et al. |
| 2012/0282924 A1 | 11/2012 | Tagg et al. |
| 2012/0303835 A1 | 11/2012 | Kempf et al. |
| 2012/0331545 A1 | 12/2012 | Baliga et al. |
| 2013/0007232 A1 | 1/2013 | Wang et al. |
| 2013/0031271 A1 | 1/2013 | Bosch et al. |
| 2013/0054763 A1 | 2/2013 | Van der Merwe et al. |
| 2013/0107725 A1 | 5/2013 | Jeng et al. |

OTHER PUBLICATIONS

G. Khanna, M. Yu Cheng, P. Varadharajan, S. Bagchi, M. P. Correia and P. J. Veríssimo, "Automated Rule-Based Diagnosis Through a Distributed Monitor System," in IEEE Transactions on Dependable and Secure Computing, vol. 4, No. 4, pp. 266-279, Oct.-Dec. 2007.*

H. Qian, S. Dispensa and D. Medhi, "Balancing Request Denial Probability and Latency in an Agent-Based VPN Architecture," in IEEE Transactions on Network and Service Management, vol. 7, No. 4, pp. 282-295, Dec. 2010.*

United States Patent and Trademark Office, "Non-Final Office Action," issued in connection with corresponding U.S. Appl. No. 12/966,681 on Dec. 20, 2012 (29 pages).

United States Patent and Trademark Office, "Notice of Allowance," issued in connection with corresponding U.S. Appl. No. 12/966,681 on Apr. 5, 2013 (9 pages).

United States Patent and Trademark Office, "Non-Final Office Action" issued in connection with corresponding U.S. Appl. No. 13/165,520 on Aug. 12, 2015 (5 pages).

Hoffmann et al., "Network Virtualization for Future Mobile Networks" Jun. 5-9, 2011, 2011 IEEE International Conference (5 pages).

United States Patent and Trademark Office, "Non-Final Office Action" issued in connection with corresponding U.S. Appl. No. 13/222,876 on Dec. 26, 2013 (18 pages).

United States Patent and Trademark Office, "Non-Final Office Action", issued in connection with corresponding U.S. Appl. No. 13/165,250 on Jan. 15, 2013 (14 pages).

United States Patent and Trademark Office, "Final Office Action", issued in connection with corresponding U.S. Appl. No. 13/165,520 on Jul. 30, 2013 (16 pages).

Van Der Merwe et al., "Dynamic Connectivity Management with an Intelligent Route Service Control Point," AT&T Labs, Proceedings of the 2006 SIGCOMM Workshop on Internet Network Management, held on Sep. 11-16, 2006, 6 pages.

Van Der Merwe et al., PowerPoint presentation of "Dynamic Connectivity Management with an Intelligent Route Service Control Point," AT&T Labs, Proceedings of the 2006 SIGCOMM Workshop on Internet Network Management, held on Sep. 11-16, 2006, 14 pages.

Brady, Kevin F., "Cloud Computing—Is It Safe for IP?" Portfolio Media, Inc., http://www.law360.com/print_article/113709 on Aug. 27, 2009. Retrieved from the Internet on Sep. 3, 2009, 8 pages.

"Amazon Elastic Computing Cloud," http://aws.amazon.com/ec2. Retrieved from the Internet on Dec. 23, 2009, 8 pages.

Armbrust et al., "Above the Clouds: A Berkeley View of Cloud Computing," Technical Report UCB/EECS-2009-28, EECS Department, University of California, Berkeley, February Technical Report No. UCB/EECS-2009-28, http://www.eecs.berkeley.edu/Pubs/TechRpts/2009/EECS-2009-28.html, Feb. 10, 2009, 25 pages.

Sundararaj et al., "Towards Virtual Networks for Virtual Machine Grid Computing," in VM '04: Proceedings of the 3rd conference on Virtual Machine Research and Technology Symposium, 2004, 14 pages.

(56) References Cited

OTHER PUBLICATIONS

Clark et al., "Live Migration of Virtual Machines," in Proceedings of NSDA, http://www.cl.cam.ac.uk/research/srg/netos/papers/2005-migration-nsdi-pre.pdf, May 2005, 14 pages.

Duffield et al., "Resource management with hoses: point-to-cloud services for virtual private networks," IEEE ACM Transactions on Networking, 2002, 16 pages.

Cohen, Reuven, "Elasticvapor Blog: Virtual Private Cloud," www.elasticvapor.com/2008/05/virtual-private-cloud-vpc.htm, May 8, 2008, 2 pages.

"Goggle App Engine" http://code.google.com/appengine/. Retrieved from the Internet on Dec. 23, 2009, 4 pages.

Nelson et al., "Fast Transparent Migration for Virtual Machines," In ATEC '05 Proceedings of the annual conference on USENIX Annual Technical Conference, 2005, 4 pages.

Ramakrishnan et al., "Live Data Center Migration Across WANs: A Robust Cooperative Context Aware Approach," n INM '07: Proceedings of the SIGCOMM workshop on Internet network management, Aug. 27-31, 2007, 6 pages.

Ruth et al., "Autonomic Live Adaptation of Virtual Computational Environments in a Multi-Domain Infrastructure," in ICAS '06: Proceedings of the 2006 IEEE International Conference of Autonomic Computing, 2006, 10 pages.

United States Patent and Trademark Office, "Non-Final Office Action" issued in connection with corresponding U.S. Appl. No. 13/222,876 on Jul. 15, 2015 (18 pages).

United States Patent and Trademark Office, "Non-Final Office Action" issued in connection with corresponding U.S. Appl. No. 13/222,876 on Feb. 26, 2015 (21 pages).

\* cited by examiner

METHODS AND APPARATUS TO CONFIGURE VIRTUAL PRIVATE MOBILE NETWORKS TO REDUCE LATENCY

FIELD OF THE DISCLOSURE

This disclosure relates generally to mobile networks and, more particularly, to methods and apparatus to configure virtual private mobile networks to reduce latency.

BACKGROUND

Virtualization of computing and networking platforms is becoming popular with clients and customers by providing flexible, customizable, on demand resources at a relatively low cost. A virtualized computing network, also known as a cloud computing network, enables clients to manage web-based applications and/or data resources by dynamically leasing computational resources and associated network resources from service providers. These web-based applications, data resources, and/or routing resources may be used by customers of the clients, individuals associated with the clients, and/or by the clients. This dynamic leasing of computational and network resources creates an appearance and function of a distributed network and, thus, is referred to as virtualization of a network. Virtualized platforms utilize partitioning and allocation of network and/or computing resources. Accordingly, new resources provisioned for a client may be quickly added as needed within short periods of time by a network provider allocating an additional portion of shared resources to the client. Additionally, virtualization in a network enables network providers to dynamically multiplex resources among multiple clients without dedicating individual physical resources to each client.

DETAILED DESCRIPTION

Figure 1:
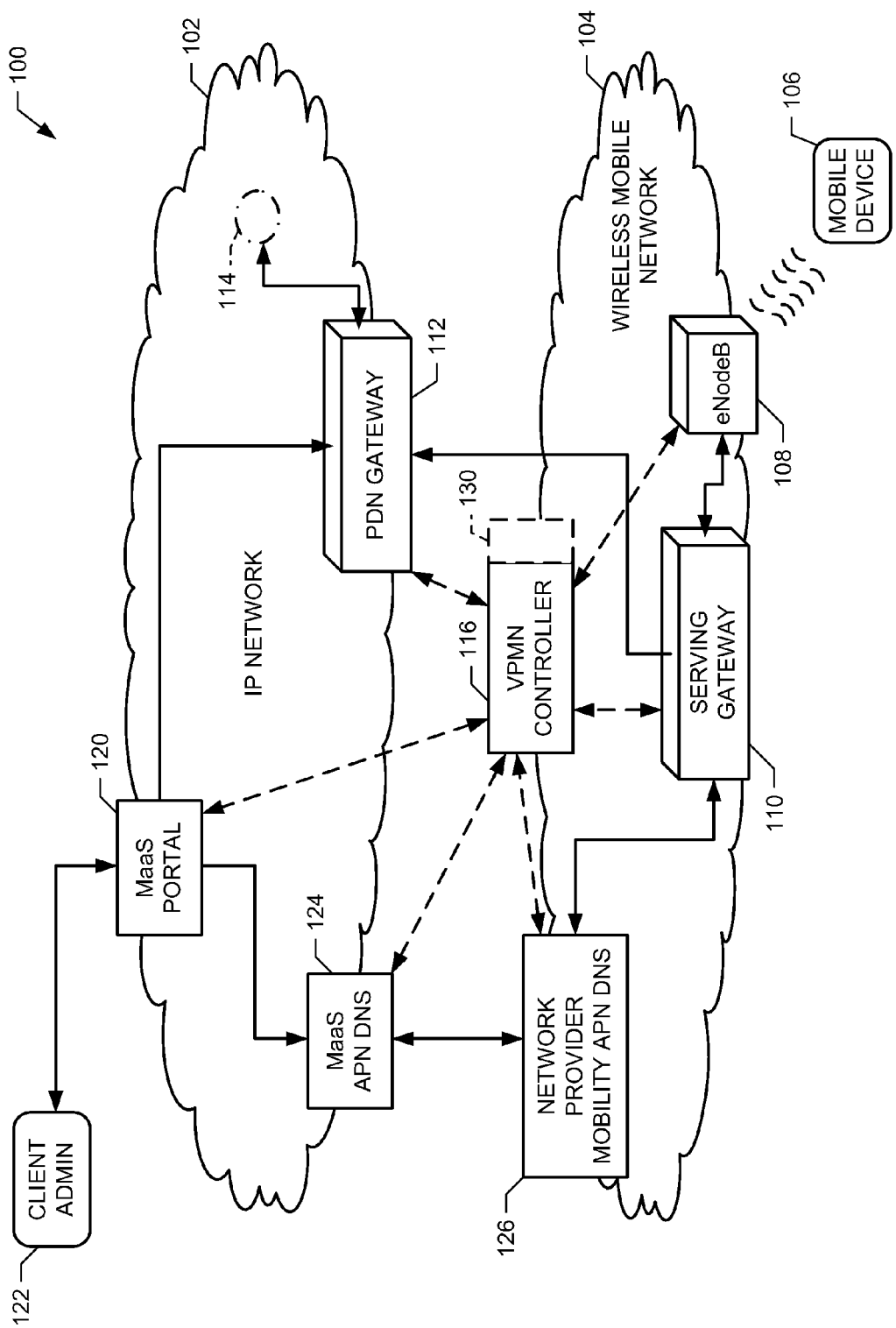
FIG. 1 is a schematic illustration of an example communication system including a wireless mobile network and a virtual private mobile network controller with a latency processor.

Example methods, articles of manufacture, and apparatus to configure virtual private mobile networks to reduce latency are disclosed. A disclosed example method includes provisioning logically a virtual private mobile network within a wireless network to reduce latency of a communication associated with a latency sensitive application. The example method further includes determining a mobile device is communicatively coupling to the wireless network via the latency sensitive application and coupling the mobile device to the virtual private mobile network to reduce latency of the communication associated with the latency sensitive application.

A disclosed example apparatus includes a latency processor to provision logically a virtual private mobile network within a wireless network and determine a mobile device is communicatively coupling to the wireless network via a latency sensitive application. The example apparatus also includes a network manager to configure the virtual private mobile network to reduce latency of communications. The example apparatus further includes a device migrator to couple the mobile device to the virtual private mobile network to reduce latency of a communication associated with the latency sensitive application, the mobile device previously coupled to a second virtual private network.

Currently, wireless mobile networks enable subscribing customers to connect to an external packet switched network (e.g., the Internet) via mobile devices. These wireless mobile networks provide wireless network service via dedicated hardware (e.g., network elements known also as mobility network elements). In many instances, network elements are configured for a corresponding wireless communication protocol. Throughout the following disclosure, reference is made to network elements associated with the $3^{rd}$ Generation Partnership Project (3GPP) Long Term Evolution (LTE) wireless communication standard. However, the disclosure is applicable to network elements associated with other wireless protocols and/or standards such as, for example, the General Packet Radio Service (GPRS) for second generation (2G) and Wideband-Code Division Multiple Access (W-CDMA) based third generation (3G) wireless networks.

In a typical wireless mobile network, a base transceiver station (BTS) (e.g., an LTE eNodeB) provides wireless communication service for mobile devices in a cell (e.g., a geographic area). The BTS enables one or more wireless devices to connect to an external packet switched network through the wireless mobile network. In these typical wireless mobile networks, a BTS is communicatively coupled to a serving gateway (e.g., a wireless network interface, router, and/or server), which routes communications between multiple BTSs and a packet data network (PDN) gateway. The PDN gateway is an interface between the wireless mobile network and external packet switched networks. In other GPRS-based wireless mobile networks, the serving gateway provides similar functionality to a Serving GPRS Support Node (SGSN) and the PDN gateway provides similar functionality to a Gateway GPRS Support Node (GGSN).

Additionally, many wireless mobile networks include a mobility management entity (MME) that monitors mobile devices on a wireless mobile network and coordinates wireless handoffs between BTSs for the mobile devices. Wireless mobile networks also include home subscriber servers (HSS) (e.g., a home location register (HLR) that mange wireless device profiles and/or authentication information. Collectively, BTSs, HSSs, HLRs, PDN gateways, and/or serving gateways are referred to as network elements, which provide a foundation for providing wireless communication services for mobile devices.

To implement a wireless mobile network, a wireless mobile network provider manages and/or configures network elements. The wireless mobile network enables customers of a wireless mobile network provider to subscribe to the wireless mobile network to receive and/or transmit voice and/or data communications. Many network providers configure network elements to provide wireless service to any subscribing customer of the network provider. For example, subscribing customers of a network provider may commonly access a wireless mobile network managed by the network provider.

Additionally, many network providers lease portions of their wireless mobile network to mobile virtual network operators (MVNOs). An MVNO (e.g., Virgin Mobile) is a company that provides mobile device services but does not own, control, and/or manage its own licensed frequency allocation of a wireless spectrum and/or does not own, control, and/or manage network elements needed to create a wireless mobile network. Network elements are capital intensive, which results in many MVNOs desiring to avoid the relatively large costs of creating and maintaining a wireless mobile network. To provide mobile device services, an MVNO leases bandwidth and/or portions of a wireless spectrum for subscribing customers of the MVNO. In this manner, an MVNO may compete with a wireless mobile network provider for customers but use the same wireless mobile network managed by the wireless mobile network provider.

In other instances, an MVNO may be a relatively large business and/or government entity that leases a portion of a wireless mobile network for private and/or proprietary use. For example, a military may lease a portion of a wireless mobile network. In these other instances, employees, agents, and/or contractors of the MVNO use the leased portion of the wireless mobile network to communicatively couple to data centers and/or computing elements managed by the MVNO.

Currently, many wireless mobile networks include relatively newer packet orientated architectures such as, for example, LTE. These newer architectures are used primarily as unintelligent transport mechanisms for data and/or communications associated with mobile devices. The wireless networks are typically predicated on previous uses of mobile device applications. For example, some years ago, most mobile device traffic was related to voice and low volume data applications (e.g., text messaging, e-mail, short message service (SMS)). However, many mobile devices today are smartphones capable of sending and/or receiving relatively high volumes of data for complex applications (e.g., media streaming, video editing, interactive gaming, etc.). In a relatively unintelligent transport network, data transfer through a mobile infrastructure to reach content servers via the Internet is the same regardless of a type of application. This data routing approach may be suboptimal for data intensive applications that require data relatively quickly. These data intensive applications are referred to herein as latency sensitive applications.

In an example, a common wireless mobile network may similarly route voice communications, low volume data, and high volume data through network elements configured with common network routing protocols. Mobile devices receive the voice communications and data as the wireless mobile network is able to process and/or route the voice communications and data. In low volume data applications, this data routing may result in some delay, which is relatively imperceptible by a user (e.g., receiving a text message a few seconds or minutes later). In relatively high volume data applications, a few tenths of a second delay can result in delayed video streaming, an interruption in streaming audio, lag during a network game, and/or significantly longer times to download data, which is highly perceptible to a user.

The example methods, apparatus, and articles of manufacture described herein dynamically and/or logically configure a wireless mobile network to reduce latency by partitioning network elements to create a virtual private mobile network (VPMN) (e.g., a latency VPMN). A latency VPMN enables wireless network providers to partition and configure a portion of network elements with routing and/or forwarding protocols that reduce propagation times during data transfers. The example latency VPMN may also enable wireless network providers to implement latency reducing protocols logically separate from routing and/or forwarding protocols for low volume data and/or communications. Thus, a latency VPMN enables wireless network providers to overcome monolithic closed wireless systems that cater to common services based on industry standards by allowing relatively efficient partitioning of network elements to provide differentiation and/or innovation via specialized support for services and/or applications that are latency sensitive.

A VPMN provides private network communications on shared network elements. In some instances, a VPMN may extend end-to-end on a wireless mobile network. In other instances, a VPMN may only be included within some network elements and/or some types of network elements. To partition (e.g., virtualize) many network elements, portions of a control plane and/or a data plane of the network elements are partitioned for a particular VPMN. Partitioning network elements may also include partitioning processing power and/or bandwidth of the network elements for a particular VPMN to separate the VPMN from other portions of a wireless mobile network. Virtualizing VPMNs in a wireless mobile network enables the VPMNs to provide a private secure virtual circuit (and/or a private path using similar technology such as, for example, a Multiprotocol Label Switching (MPLS) path) extending from mobile devices to an external packet switched network, other mobile devices, and/or data centers of an MVNO.

To provision a latency VPMN, the example methods, apparatus, and articles of manufacture described herein determine which network elements within a wireless mobile network have available capacity and/or bandwidth to host a latency VPMN. The example methods, apparatus, and articles of manufacture described herein configure data and/or control planes of the determined network elements to host the latency VPMN. The control planes may create wireless mobile network virtual circuits and/or paths between the network elements to isolate communications within a latency VPMN from communications external to the latency VPMN. The example methods, apparatus, and articles of manufacture described herein then determine which mobile devices should be migrated to the latency VPMN by identifying which mobile devices are operating latency sensitive applications and/or associated with latency sensitive communications. Latency sensitive communications include any data transmitted and/or received by a latency sensitive application.

The example methods, apparatus, and articles of manufacture described herein communicatively couple mobile devices associated with latency sensitive communications to the latency VPMN by configuring the mobile devices with an Access Point Name (APN) that corresponds to the latency VPMN. Upon configuring the network elements and the mobile devices with the assigned APN, the example methods, apparatus, and articles of manufacture described herein route and/or process communications associated with the mobile devices through the latency VPMN to destinations reachable via the Internet.

The example methods, apparatus, and articles of manufacture described herein may provision a latency VPMN for a client (e.g., an MVNO) of a wireless network provider. The client utilizes a latency VPMN to provide enhanced services that differentiate the client from other MVNOs and/or network providers. For example, an MVNO can promote a latency VPMN that routes data relatively faster for latency sensitive applications compared to a wireless network provider.

In some examples, a wireless network operator may partition different latency VPMNs for different types of latency sensitive applications. For example, a first latency VPMN may be configured with routing protocols that create virtual tunnels to reduce propagation times for streaming data applications. Additionally, a second latency VPMN may be configured with in-band controls and/or routing protocols to equalize and/or reduce latency between mobile devices communicatively coupled together playing a common network application. Further, a third latency VPMN may be configured with data transfer protocols to enable mobile devices to offload relatively complex data processing algorithms and/or functions to network elements that have more processing capability (e.g., cloud computing based applications).

Latency sensitive applications are programs, algorithms, functions, and/or routines operating on mobile devices that process, download, and/or upload relatively large volumes of time-sensitive data. For example, streaming media applications require a relatively quick and consistent download speed for a high volume of data to play movies, videos, music, website content, and/or any other media type. Any delay in receiving data may cause a media streaming application to pause the media until the data is received. In another example, network gaming applications require relatively constant and quick download and upload of data so that gaming environments are synchronized between communicatively coupled mobile devices and/or gaming servers. Any delay in data transfer can result in game lag and frustrated players. In another example, a latency sensitive application includes computational applications (e.g., video editing applications, cloud computing applications, etc.) that offload processing capabilities from a mobile device to a data center, remote server, and/or network elements. Any delay in data transfer may result in longer processing times.

In the interest of brevity and clarity, throughout the following disclosure, reference will be made to an example communication system 100 of FIG. 1 associated with the LTE standard. However, the methods, articles of manufacture, and apparatus described herein to configure virtual private mobile networks to reduce latency are applicable to other types of networks constructed using other network technologies, topologies and/or protocols.

FIG. 1 illustrates the example communication system 100 that includes an Internet Protocol (IP) network 102 (e.g., an external packet switched network, the Internet, X.25, a WiMax network, etc.) and a wireless mobile network 104. The IP network 102 includes any number and/or types of routers, switches, servers, etc. to enable communications (e.g., packet-based data). The IP network 102 utilizes and/or conforms to any routing and/or communication protocols. The example wireless mobile network 104 (e.g., wireless network) includes any network for routing and/or managing communications between the IP network 102 and mobile devices (e.g., mobile device 106).

In the illustrated example, the wireless mobile network 104 is shown as including and/or associated with network elements 108-112. The example network elements 108-112 are shown as one example of communicatively coupling the mobile device 106 to the IP network 102. In other examples, the wireless mobile network 104 can include additional network elements and/or different types of network elements including, for example, an MME, an HSS, and/or a policy charging and rules function (PCRF) server. Further, the example network elements 108-112 correspond to the LTE standard. In other examples, the network elements 108-112 may be associated with any other wireless communication protocol and/or standard including, for example, Universal Mobile Telecommunication System (UMTS) and/or GPRS.

The example mobile device 106 (e.g., user equipment (UE)) of the illustrated example includes any device capable of wirelessly communicatively coupling to the wireless mobile network 104. For example, the mobile device 106 includes any laptop, smartphone, computing pad, personal digital assistant, tablet computer, personal communicator, etc. Additionally, while FIG. 1 shows the mobile device 106, in other examples, the communication system 100 may include additional mobile devices.

To wirelessly connect to the wireless mobile network 104, the wireless mobile network 104 includes the eNodeB 108. The example eNodeB 108 is a BTS (e.g., an access point) and includes any controllers, transmitters, receivers, and/or signal generators to provide a wireless spectrum to facilitate wireless communication with, for example, the mobile device 106. The eNodeB 108 transforms communications received from the serving gateway 110 into a wireless signal transmitted to the mobile device 106. Similarly, the eNodeB 108 transforms wireless communications received from the mobile device 106 into a wired communications that may be routed to the IP network 102.

To route communications to and/or from the eNodeB 108, the wireless mobile network 104 of FIG. 1 includes the serving gateway 110. The example serving gateway 110 routes and/or forwards communications (e.g., data packets) between the PDN gateway 112 and mobile devices that are within a geographical area assigned to the serving gateway 110. Location registers within the example serving gateway 110 store location information including, for example, a geographic location of the eNodeB 108, visitor location register (VLR) information, and/or user profile information of the mobile device 106. The example serving gateway 110 may also provide authentication and/or charging functions to enable the mobile device 106 to access the wireless mobile network 104.

The example serving gateway 110 also functions as a mobility anchor for a user plane during inter-eNodeB handovers of the mobile device 106. In other words, the serving gateway 110 ensures the mobile device 106 is connected to an eNodeB when the mobile device 106 moves to a different physical location. The example serving gateway 110 further manages and stores contexts (e.g. parameters of the IP wireless mobile network, latency routing information, latency sensitive applications, and/or network internal routing information) associated with the mobile device 106. While the wireless mobile network 104 of FIG. 1 shows the single serving gateway 110, the wireless mobile network 104 may include additional serving gateways.

To interface with the IP network 102 of the illustrated example, the example wireless mobile network 104 is associated with the PDN gateway 112. In this example, the PDN gateway 112 is communicatively coupled to the IP network 102 via an interface 114. The example PDN gateway 112 functions as a router by routing communications from the wireless mobile network 104 to an appropriate edge and/or network router within the IP network 102. Also, the PDN gateway 112 routes communications directed to the mobile device 106 from the IP network 102 to an appropriate serving gateway (e.g., the gateway 110). In some examples, the PDN gateway 112 may determine if the mobile device 106 is active (e.g., available to receive the communications) by sending a query to the serving gateway 110. If the serving gateway 110 indicates the mobile device is active 106, the serving gateway 110 sends a response to the PDN gateway 112 causing the PDN gateway 112 to forward the communications to the serving gateway 110. If the mobile device 106 is inactive and/or unavailable, the PDN gateway 112 may discard the communications and/or query other serving gateways in the wireless mobile network 104.

In some examples, the PDN gateway 112 transforms and/or converts communications originating from the mobile device 106 received via the serving gateway 110 into an appropriate packet data protocol (PDP) format (e.g., IP, X.25, etc.) for propagation through the IP network 102. Additionally, for communications received from the IP network 102, the PDN gateway 112 converts the communications into a wireless protocol (e.g., 3GPP LTE, Global System for Mobile Communications (GSM), etc.). The example PDN gateway 112 then readdresses the communications to the corresponding serving gateway 110.

To configure VPMNs on the network elements 108-112, the wireless mobile network 104 includes a VPMN controller 116. The example VPMN controller 116 receives requests from the network elements 108-112 to create a VPMN (e.g., a latency VPMN) to communications associated with latency sensitive applications originating from, for example, the mobile device 106. The example VPMN controller 116 may also receive requests from clients (e.g., MVNOs) for VPMNs. To create a VPMN, the example VPMN controller 116 identifies available portions of the network elements 108-112 for the requested VPMNs, and partitions control and/or data plane space on the network elements 108-112 to configure the VPMNs. In some examples, the VPMN controller 116 may also configure the mobile device 106 to access a VPMN.

To receive requests to create a VPMN, the example communication system 100 of FIG. 1 includes a Mobility-as-a-Service (Maas) portal 120. The MaaS portal 120 enables clients to specify requirements (e.g., latency protocols) for a VPMN. In some examples, the MaaS portal 120 may be an interface of the VPMN controller 116 that a client accesses via the IP network 102. In other examples, the client may directly access the VPMN controller 116.

In the illustrated example, a client administrator 122 (e.g., a client) accesses the MaaS portal 120 to request a VPMN. The request for a VPMN may include a list of mobile devices that are to be authorized to access the VPMN, an estimated maximum and/or average amount of bandwidth to be utilized, a geographic location for the VPMN (including a geographic location of the eNodeB 108 and/or the serving gateway 110), administrative information, billing information, security information, latency routing information, and/or any other information that may be needed to provision a VPMN.

In response to the client administrator 122 requesting a VPMN, the MaaS portal 120, via the VPMN controller 116, establishes a VPMN through the network elements 108-112. Examples of VPMNs are described below in conjunction with FIGS. 2-5. To enable mobile devices associated with the client administrator 122 to access the newly created VPMN, the VPMN controller 116 assigns the VPMN an APN. The APN enables communications from identified mobile devices to be routed through the wireless mobile network 104 via a VPMN.

An APN identifies a PDN that a mobile device requests to communicatively couple. The APN may also define a type of service, server, and/or multimedia message service that is provided by a PDN. Typically, an APN includes a network identifier and an operator identifier. The network identifier may define an external network to which the PDN gateway 112 is connected (e.g., the IP network 102). The operator identifier specifies which network (e.g., VPMN) is associated with the PDN gateway 112. In the example of FIG. 1, the VPMN controller 116 uses operator identifiers of APNs to identify to which VPMN communications from a mobile device are to be routed.

The example VPMN controller 116 of the illustrated example transmits an assigned APN to subscribing customers identified to be communicatively coupled to a VPMN. The VPMN controller 116 also registers the APN with APN domain name system (DNS) servers 124 and 126 within the respective networks 102 and 104. Registering the APN with the APN DNS servers 124 and 126 enables communications associated with a VPMN to be routed to the appropriate VPMN on the network elements 108-112 when the VPMN controller 116 is unable to extend the VPMN from end-to-end (e.g., from the eNodeB 108 to the interface 114 of the PDN gateway 112). Thus, the use of APNs enables the VPMN controller 116 to provision a VPMN over a portion of the network elements 108-112 when other network elements are not capable and/or are not configured to host the VPMN.

To determine which communications from, for example, the mobile device 106 are latency sensitive and/or potentially latency sensitive, the example VPMN controller 116 of FIG. 1 includes a latency processor 130. The example latency processor 130 stores latency routing rules for the wireless mobile network 104 that include identifiers of latency sensitive applications, profiles of high volume data, and/or protocols to reduce latency within a latency VPMN. The latency sensitive identifiers, profiles, and/or the protocols may be specified by, for example, the client administrator 122, and/or an operator of the wireless mobile network 104. In other examples, the example latency processor 130 may compile and/or aggregate instances of latency sensitive communications to determine additional protocols, algorithms, and/or routing rules for reducing latency for one or more types of latency sensitive applications.

The example latency processor 130 of FIG. 1 transmits latency routing rules and/or identifiers of latency sensitive applications to each of the VPMNs implemented on the network elements 108-112. The latency processor 130 may also transmit the latency routing rules and/or identifiers of latency sensitive applications to the network elements 108-112 in instances where the network elements 108-112 process communications separate from a VPMN. In some instances, the latency processor 130 may transmit different sets of latency routing rules to different VPMNs based on instructions from, for example, the client administrator 122. For example, some client administrators may only be concerned with network gaming lag for their respective VPMNs while other client administrators may be concerned with cloud computing application delays and/or media application streaming delays for their respective VPMNs.

The example VPMNs and/or the network elements 108-112 use the identifiers of latency sensitive applications to identify latency sensitive communications. In other examples, the latency processor 130 may monitor VPMNs and/or the network elements 108-112 for latency sensitive communications. After detecting latency sensitive communications, the VPMNs and/or the network elements 108-112 broadcast information associated with the communications and/or an identifier of a mobile device associated with the communications to other VPMNs and/or the latency processor 130. The VPMNs and/or the latency processor 130 may then determine if, for example, the mobile device 106 is associated with other latency sensitive communications and transmits information associated with those identified communications.

The example latency processor 130 and/or the VPMNs of the illustrated example use the information regarding the latency sensitive communications to provision, for example, the mobile device 106 to a VPMN designated to reduce latency through the wireless mobile network 104 (e.g., a latency VPMN). In some instances, the example network elements 108-112 may already have a VPMN for latency provisioned. In other examples, the latency processor 130 provisions a VPMN after latency sensitive communications are detected. The example latency processor 130 and/or a VPMN that detected the communications communicatively couples the mobile device 106 to the latency VPMN. To communicatively couple the mobile device 106, the example latency processor 130 and/or the detecting VPMN uses over the air programming to send an APN associated with the latency VPMN to the mobile device and/or the network elements 108-112. In some examples, the over the air programming may include provisioning a subscriber identity module (SIM) card of the mobile device 106 with an APN corresponding to the latency VPMN.

The example latency VPMN processes and/or routes communications from the mobile device 106. The example latency VPMN propagates the latency sensitive communications associated with the mobile device 106 through the wireless mobile network 104 to the IP network 102 separate and/or isolated from other non-latency sensitive communications from other mobile devices. The mobile device 106 may transmit and/or receive all communications (e.g., latency sensitive and non-latency sensitive) through the latency VPMN as long as the mobile device 106 transmits and/or receives some latency sensitive communications. After the mobile device 106 finishes processing latency sensitive communications and/or terminates latency sensitive application(s), the example latency VPMN and/or the latency processor 130 migrate the mobile device 106 to an originally connected VPMN and/or to the general non-VPMN portions of the network elements 108-112. In other examples, the latency processor 130 may provision the mobile device 106 so that latency sensitive applications transmit and/or receive communications via the a latency VPMN while non-latency sensitive applications transmit and/or receive communications via non-VPMN potions of the network elements 108-112 and/or via non-latency configured VPMNs. In these other examples, the mobile device 106 includes at least dual identities that enables the mobile device 106 to provision each identity to a different APN.

While the example discusses creating a general latency VPMN for any detected latency sensitive application, the example latency processor 130 of FIG. 1 may create different latency VPMNs for different types of latency sensitive applications. For example, a first latency VPMN may be created specifically for network gaming and include protocols and/or in-band controls for equating latency at relatively fine granular levels between communicatively coupled mobile devices. Additionally, a second latency VPMN may be created for media applications and include processing and/or routing protocols configured to create virtual network tunnels to reduce data propagation times through the wireless mobile network 104.

Figure 2:
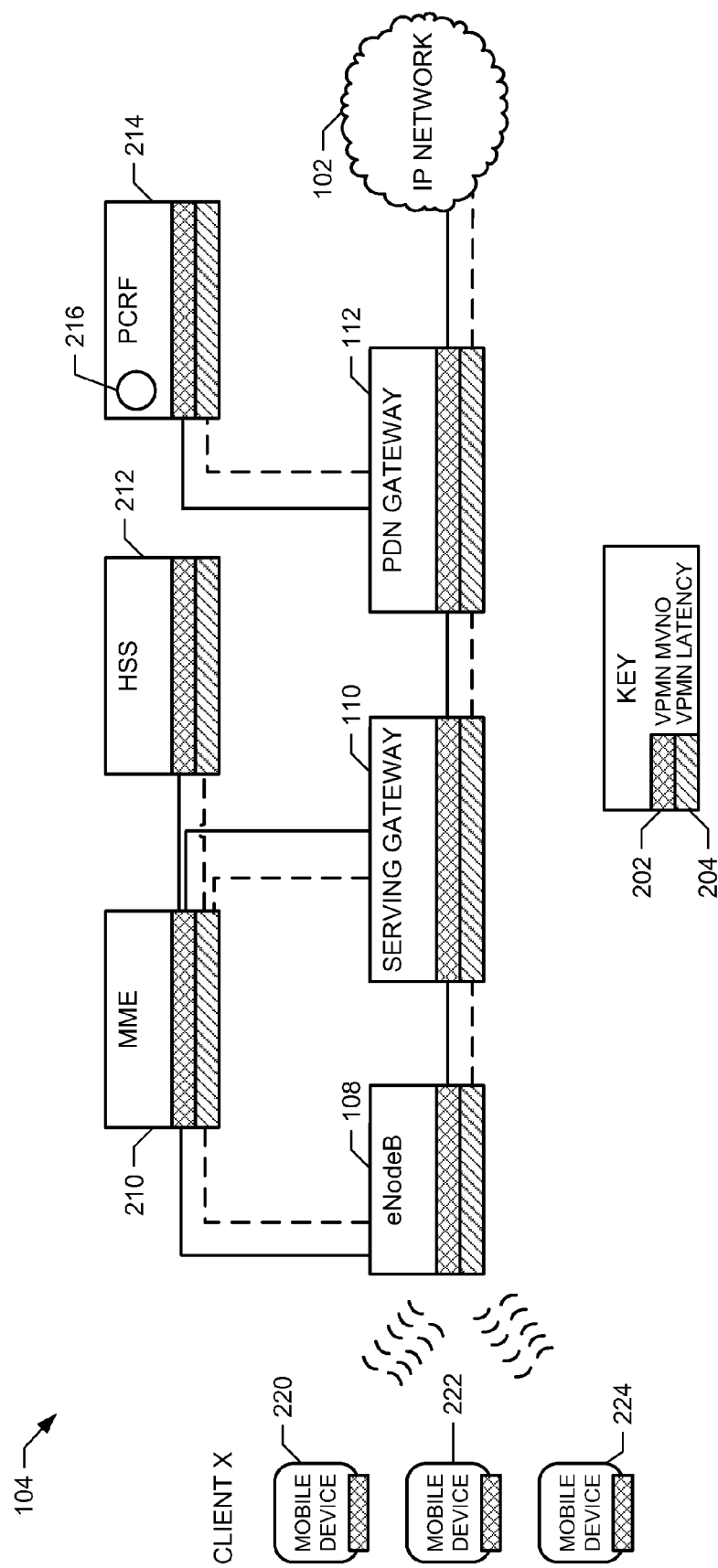
FIGS. 2-5 illustrate the example wireless mobile network of FIG. 1 with example virtual private mobile networks to reduce latency.
Figure 3:
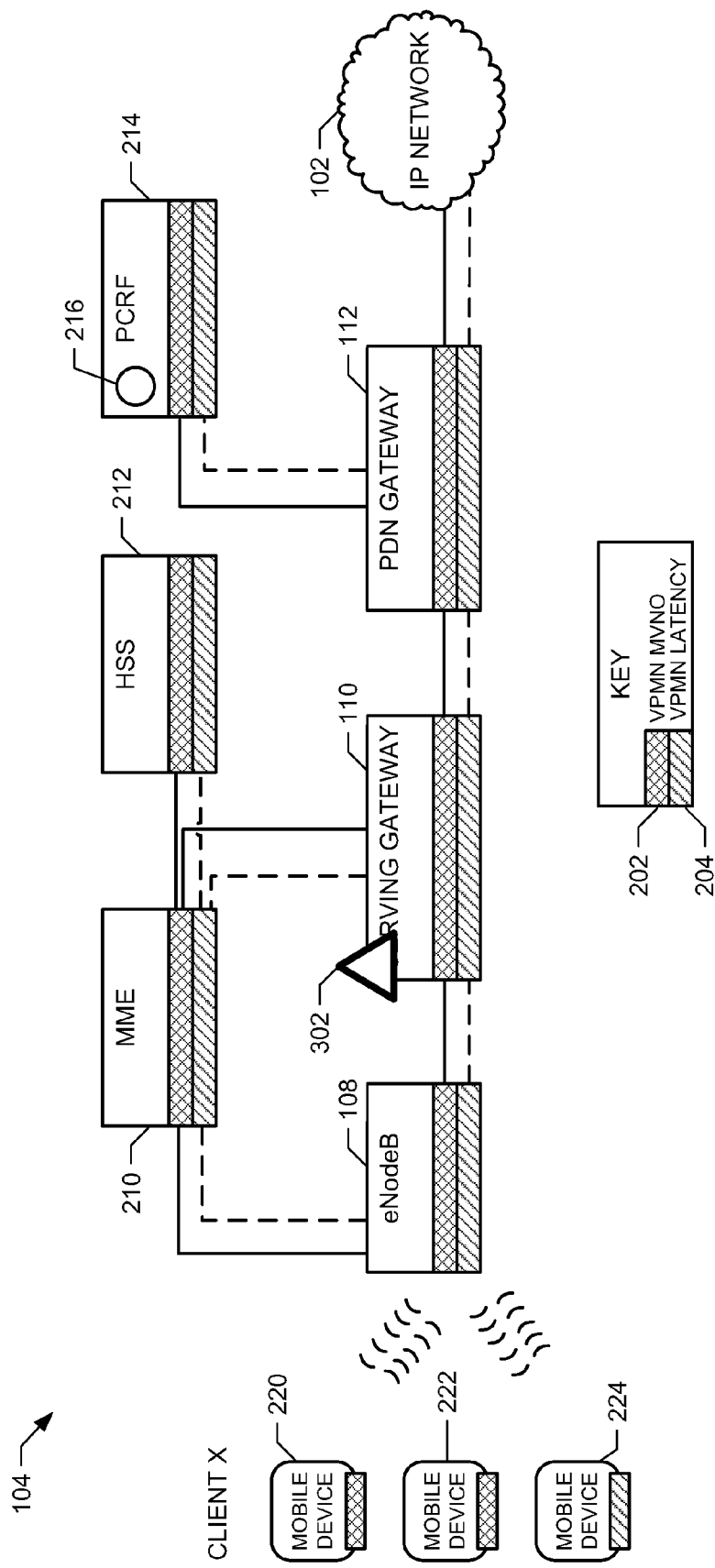
Figure 4:
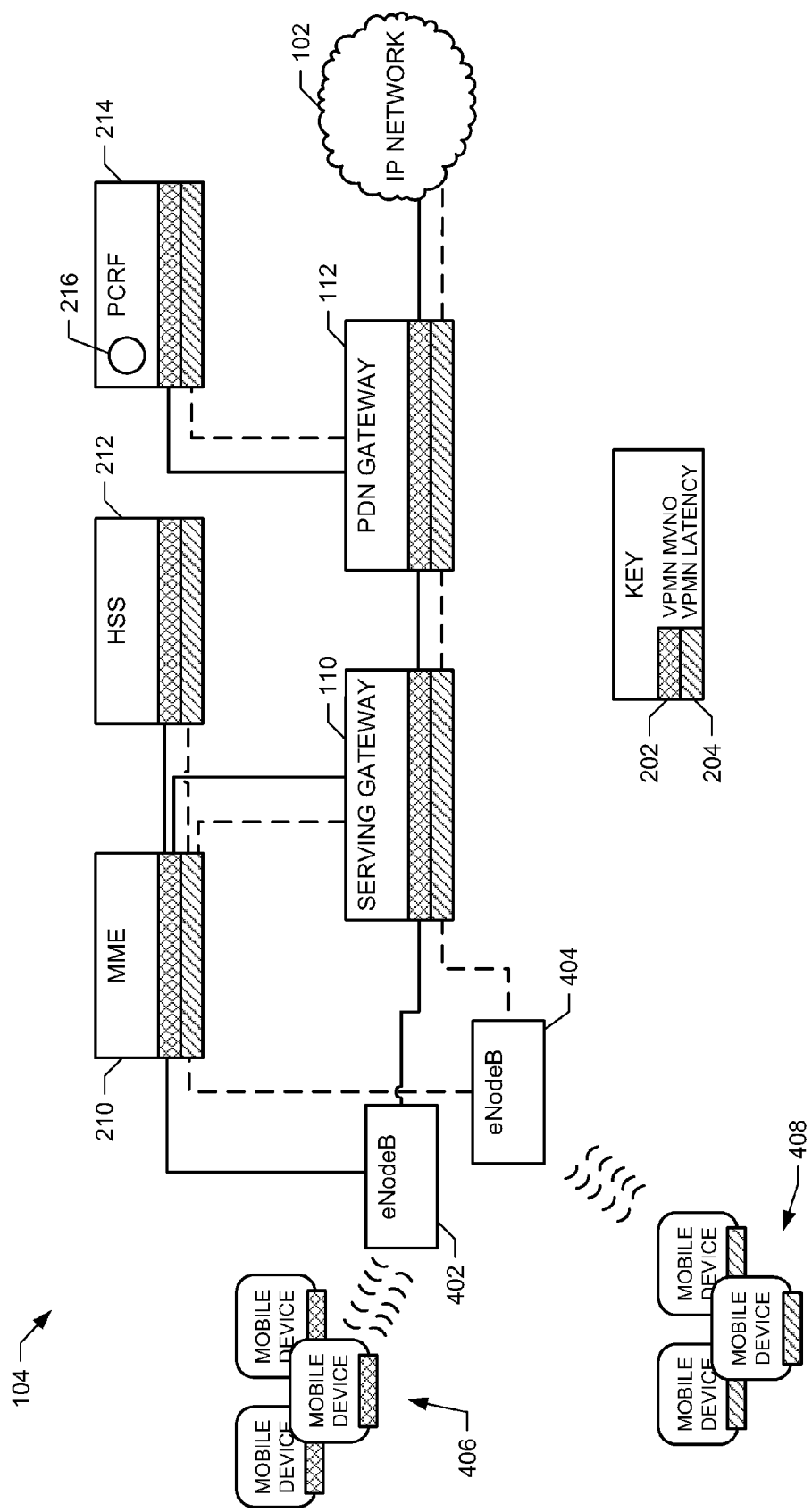

FIGS. 2-4 show the example wireless mobile network 104 of FIG. 1 with VPMNs 202 and 204. In these illustrated examples, the VPMN 202 is associated with and/or configured for a Client X and the VPMN 204 is designated for communications associated with latency sensitive applications (e.g., a latency VPMN). In other examples, the wireless mobile network 104 may include additional VPMNs or fewer VPMNs. In the example of FIG. 2, the wireless mobile network 104 includes the network elements 108-112 of FIG. 1. Additionally, the wireless mobile network 104 includes an MME 210, an HSS 212, and a PCRF server 214. In other examples, the wireless mobile network 104 may include additional network elements and/or additional types of network elements.

The example MME 210 tracks and pages mobile devices that are communicatively coupled to the wireless mobile network 104. The example MME 210 may also activate and/or deactivate mobile devices and/or authenticate mobile devices attempting to connect to the wireless mobile network 104 by requesting user profile information from the HSS 212. In some examples, the MME 210 may be similar to the servers 124 and 126 of FIG. 1 by selecting the appropriate serving gateway 110 and/or PDN gateway 112 when mobile devices provide an APN to connect to one of the VPMNs 202 and 204.

The example HSS 212 of FIG. 2 includes a database of subscription-related information (e.g., subscribing customer profiles). The example HSS 212 performs authentication and/or authorization of a mobile device attempting to access the wireless mobile network 104 by providing the MME 210 with mobile device profile information to match to profile information by the requesting mobile device. The HSS 212 may also include information about a geographic location of a subscribing customer and/or IP information associated with a mobile device of the customer.

The example PCRF server 214 determines policy rules for the wireless mobile network 104. The example PCRF server 214 aggregates information to and/or from the wireless mobile network 104 and/or the network elements 108-112, 210, and 212 in real time to create rules. The example PCRF 214 may also store latency routing rules 216 that include identifiers of latency sensitive applications. Based on the created rules, the PCRF server 214 automatically makes intelligent policy decisions for each mobile device active on the wireless mobile network 104. In this manner, the PCRF server 214 enables a wireless mobile network provider to offer multiple services, quality of service (QoS) levels, and/or charging rules. Additionally, the PCRF server 214 may also broadcast and/or transmit the latency routing rules 216 to the portions of the network elements 108-112, 210 and 212 hosting the VPMNs 202 and 204.

In the example of FIG. 2, the Client X requests the VPMN 202 from the VPMN controller 116 of FIG. 1 to enable mobile devices 220-224 to subscribe to a service offered by the Client X to connect to the IP network 102. The example Client X may also specify the latency routing rules 216 for identifying communications associated with latency sensitive applications within the VPMN 202. In this example, the Client X may be an MVNO.

In this illustrated example, the Client X requests that the VPMN 202 extend end-to-end of the wireless mobile network 104. As a result of the request, the VPMN controller 116 extends the VPMN 202 to all of the network elements 108-112 and 210-214 within the wireless mobile network 104. In other examples, the Client X may only request and/or may only be able to request a VPMN to be setup on some of the network elements 108-112 and 210-214. By requesting the VPMN 202, the example VPMN controller 116 identifies available space within the network elements 108-112 and 210-214 and allocates control and/or data planes of the network elements 108-112 and 210-214 for the VPMN 202. The VPMN controller 116 then configures the allocated control and/or data plane portions of the network elements 108-112 and 210-214 for the VPMN 202.

To configure the network elements 108-112 and 210-214, the example VPMN controller 116 may assign an APN to the VPMN 202 and update a control plane of the network elements 108 and 210-214 with the APN assignment. The VPMN controller 116 may also assign and/or configure specific interfaces, switches, and/or processors within the network elements 108-112 and 210-214 to host the VPMN 202.

The mobile devices 220-224 use the assigned APN to access the respective VPMN 202. Further, by using the APN, the network elements 108-112 and 210-214 may propagate communications within the VPMN 202 until an end point is reached. By using APNs, the example VPMN controller 116 creates exclusive virtual circuits (e.g., MPLS paths) from the eNodeB 108 to the PDN gateway 112 for routing communications within the VPMN 202 for the mobile devices 220-224 registered with the Client X MVNO. Thus, the APNs ensure that communications from the mobile devices 220-224 are routed through the wireless mobile network 104 via the VPMN 202.

Further, the VPMN 202 partitioned within the network elements 210-214 enables access control, authentication, mobile device profile management, latency routing rules, latency sensitive identifiers, and/or network rules to be configurable for the Client X. Thus, subscriber information for the Client X within the HSS 212 is separate from subscriber information associated with other VPMNs (not shown) and/or subscribers that use non-VPMN portions of the network elements 108-112 and 210-214. The separation of the control and/or data planes of the network elements 210-214 via the VPMN 202 also enables the Client X to provide different types of services (e.g., routing of communications that are latency sensitive) using the same network elements 108-112 and 210-214. Further, the separation of the control and/or data planes of the network elements 210-214 via the VPMN 202 prevents security issues in, for example, the VPMN 202 from propagating to other portions of the network elements 108-112 and 210-214.

The example wireless mobile network 104 of FIG. 2 also includes the latency VPMN 204 within the network elements 108-112 and 210-214. In other examples, the latency VPMN 204 may be included only within some of the network elements 108-112 and 210-214. In this example, the latency VPMN 204 is provisioned for the Client X as a VPMN to process communications associated with latency sensitive applications detected within the VPMN 202. When there are relatively few communications to process, the example latency VPMN 204 may allocate relatively less bandwidth and/or processing capacity from among the network elements 108-112 and 210-214 compared to bandwidth and/or processing capacity allocated for the VPMN 202.

FIG. 3 shows the example wireless mobile network 104 of FIG. 2 detecting latency sensitive communications 302. In this example, the serving gateway 110 detects the latency sensitive communications 302 within the VPMN 202 associated with the Client X. The example serving gateway 110 may detect the latency sensitive communications 302 by matching identifiers (e.g., identifiers of applications associated with the communications) within the communications to identifiers specified within, for example, the latency routing rules 216. Alternatively, the serving gateway 110 may detect latency sensitive communications based on a volume of data. For example, the serving gateway 110 may detect that an application on the mobile device 224 is receiving a relatively large quantity of data, which may indicate the data is latency sensitive. The example serving gateway 110 may also detect the latency sensitive communications 302 by matching information associated with communications to subscriber information within the HSS 212.

In yet other examples, the mobile device 224 may set a bit, byte, and/or transmit a message indicating that communications are latency sensitive. In these other examples, the Client X may pre-configure the mobile device 224 with a function that identifies latency sensitive applications. The example feature may then tag and/or identify outgoing communications from a latency sensitive application as latency sensitive. Further, the Client X may configure the VPMN 202 to include a protocol that searches for the latency sensitive tag and/or identifier.

After detecting the latency sensitive communications 302, the example serving gateway 110 transmits information regarding the latency sensitive communications 302 to the other network elements 108, 112, and 210-214. The serving gateway 110 may also transmit the information to the example latency processor 130 within the example VPMN controller 116. The serving gateway 110 may communicate with the other network elements 108, 112, and 210-214, the VPMN controller 116, and/or any other VPMNs (not shown) via a controlled interface (e.g., an application programming interface (API)). The transmission of the latency sensitive information causes the network elements 108, 112, and 210-214 to determine if any communications that match the information associated with the latency sensitive communications are included within their respective portions of the VPMN 202. The example serving gateway 110 and/or the network elements 108, 112, and 210-214 may use the latency sensitive communication information to identify, for example, that the mobile device 224 is associated with (e.g., originated) the latency sensitive communications 302.

To communicatively couple the mobile device 224 to the latency VPMN 204, the example serving gateway 110 sends the mobile device 224 an APN that corresponds to the latency VPMN 204. For example, the serving gateway 110 may provision a SIM card of the mobile device 224 with the APN. Further, the example serving gateway 110 may broadcast the provisioning of the mobile device 224 to the other network elements 108, 112, and 210-214 hosting the VPMNs 202 and 204 so that the network elements 108, 112, and 210-214 route and/or process communications associated with the mobile device 224 through the latency VPMN 204 using the newly assigned APN.

Once the mobile device 224 is communicatively coupled to the latency VPMN 204, protocols, in-band controls, routing algorithms, and/or analysis tools may determine specific information regarding the latency sensitive communications 302 and/or the corresponding latency sensitive application. The protocols and/or analysis tools may be used to determine an appropriate strategy for the mobile device 224. For example, the VPMN 204 may send a message to a user of the mobile device 224 that the mobile device 224 has been provisioned for the latency VPMN 204 to improve performance of latency sensitive applications. In other instances, the protocols and/or the analysis tools of the latency VPMN 204 may utilize resources of, for example, the network elements 108-112 and 210-214 to provide processing of functions associated with a latency sensitive application. Further, the example latency VPMN 204 may continue to isolate communications associated with the mobile device 224 from the VPMN 202 until the latency sensitive applications on the mobile device 224 are terminated.

The protocols deployed within the latency VPMN 204 improve propagation times of communications between the mobile device 224 and, for example, the IP network 102. Thus, the example latency VPMN 204 ensures that latency sensitive communications associated with the mobile device 224 are processed within the portions of the network elements 108-112 and 210-214 that are specifically configured to route and/or process the latency sensitive communications while other communications associated with, for example, the mobile devices 220 and 222 are processed using routing protocols that are not configured for latency sensitive communications. In this manner, the example Client X only needs to deploy and/or utilize additional protocols within the portions of the network elements 108-112 and 210-214 that are provisioned to host the latency VPMN 204, thereby reducing protocols used for the VPMN 202. Thus, by not having to deploy latency protocols within the VPMN 202, the Client X can reduce overhead, processing capacity, and/or control plane information for the VPMN 202.

FIG. 4 shows the example wireless mobile network of FIGS. 1-3 with the example VPMNs 202 and 204. In this example, the eNodeB 108 of FIGS. 1-3 is replaced with eNodeBs 402 and 404. The example eNodeB 402 is communicatively coupled to the example VPMN 202 and the example eNodeB 404 is communicatively coupled to the example latency VPMN 204. Thus, FIG. 4 shows that each of the VPMNs 202 and 204 can be communicatively coupled to the physically separate eNodeBs 402 and 404, which are both coupled to respective portions of the serving gateway 110.

The example eNodeBs 402 and 404 of the illustrated example are physically separate to create isolation in a wireless spectrum between the VPMNs 202 and 204. In other words, the entire eNodeB 404 is configured with protocols (and/or hardware) to reduce latency in communications associated with the mobile devices 408. Thus, the mobile devices 406 provisioned for the VPMN 202 are communicatively coupled to the example eNodeB 402 and mobile devices 408 provisioned for the latency VPMN 204 are communicatively coupled to the example eNodeB 404. In this example, the mobile devices 408 are associated with latency sensitive communications and/or applications. For example, the mobile devices 408 may operate a network gaming application, media streaming applications, or intensive processing applications that can be offloaded to, for example, the network elements 110, 112, 210-214, and/or 404.

To reduce latency for identified applications, the example VPMN controller 116, the example latency processor 130, and/or the network elements 110, 112, 210-214, and/or 402 migrate the mobile devices 408 to the latency VPMN 204 from the VPMN 202. To communicatively couple the mobile devices 408 to the eNodeB 404, the example serving gateway 110 may transmit an APN to the mobile devices 408 and/or the network elements 110, 112, 210-214, and/or 404 that corresponds to the latency VPMN 204. The mobile devices 408 may then communicate with destinations reachable via the IP network 102 using virtual circuits within the latency VPMN 204 configured to reduce latency and/or communication propagation time.

In some examples, the mobile devices 408 (e.g., smartphones and/or tablet computers) may be determined to include many latency sensitive applications that require communication with the IP network 102. In these examples, the mobile devices 408 may be pre-configured to be communicatively coupled to the latency VPMN 204 regardless of detected latency sensitive communications because the mobile devices 408 are predisposed to utilize many latency sensitive applications. After a time period, the example latency processor 130 and/or the VPMN controller 116 may determine that one of the mobile devices 408 does not routinely operate latency sensitive applications. In these instances, the latency processor 130 and/or the VPMN controller 116 may migrate the identified mobile device to the VPMN 202.

Figure 5:
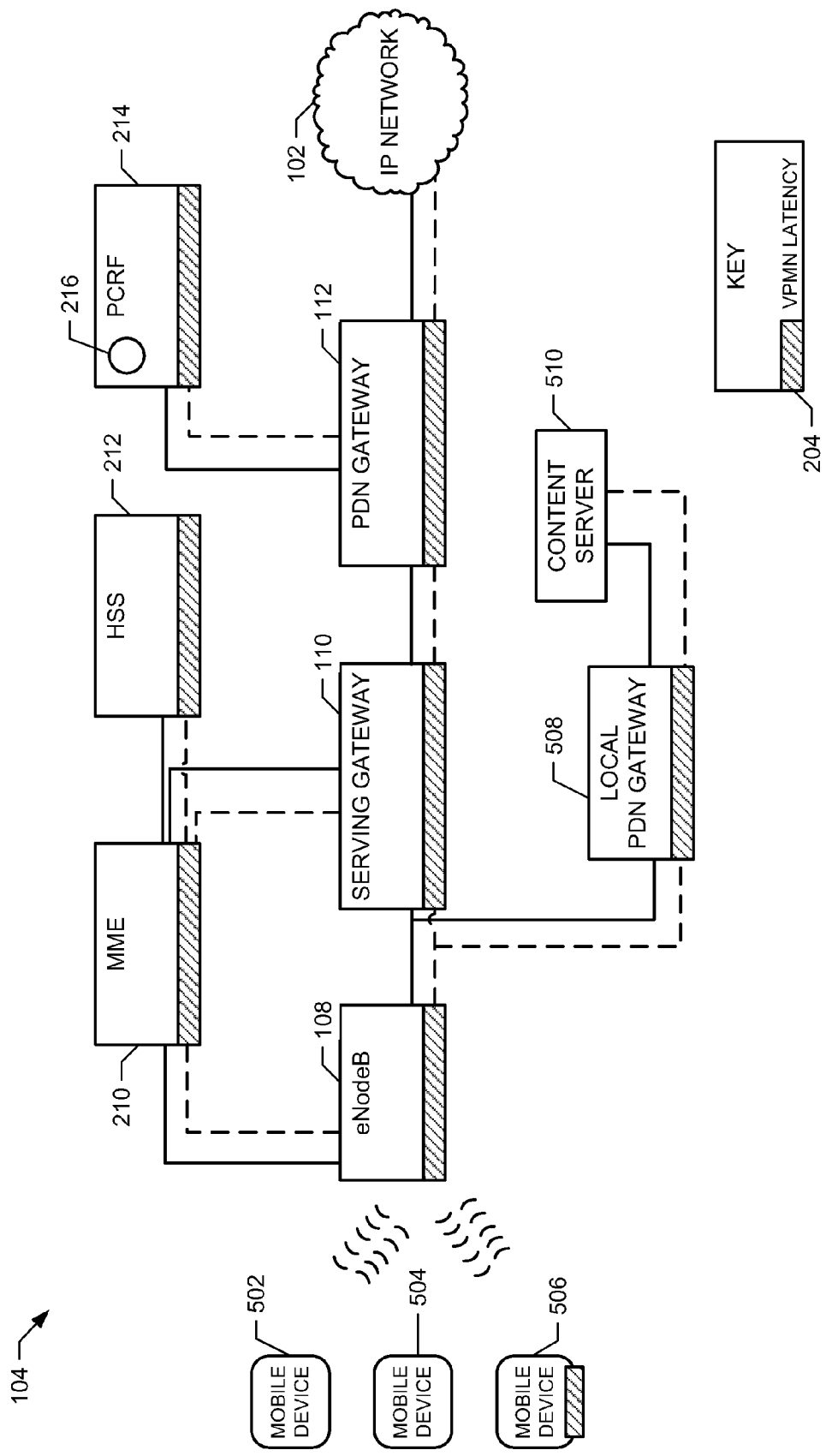

FIG. 5 shows the example wireless mobile network 104 of FIGS. 1-4 with the example latency VPMN 204. In this example, a network provider routes and/or processes communications from mobile devices (e.g., mobile devices 502-506) via the example network elements 108-112 and 210-214 without a VPMN (e.g., the VPMN 202). The network provider uses the example latency VPMN 204 to route and/or process latency sensitive communications separate from other communications. Thus, in this example, the example latency VPMN 204 is logically partitioned within the network elements 108-112 and 210-214 separate from non-VPMN portions of the network elements 108-112 and 210-214.

In the illustrated example, the example mobile devices 502 and 504 are communicatively coupled to the wireless mobile network 104 and/or the IP network 102 via the network elements 108-112 and 210-214. Additionally, the mobile device 506 is communicatively coupled to the wireless mobile network 104 via the latency VPMN 204 provisioned within the network elements 108-112 and 210-214. In this example, the mobile device 506 is identified as being associated with latency sensitive communications.

The example of FIG. 5 also includes a local PDN gateway 508 (e.g., mobility data center) and a communicatively coupled content server 510. The example local PDN gateway 508 is included within the example wireless mobile network 104 and communicatively coupled to the serving gateway 110. Additionally, the latency VPMN 204 is provisioned within the local PDN gateway 508 to enable the wireless device 506 to access the content server 510.

The example local PDN gateway 508 may be utilized within the example wireless mobile network 104 to reduce propagation times of communications between, for example, the mobile devices 502-506 and the content server 510. In many wireless networks, the example PDN gateway 112 can be located thousands of miles from the serving gateway 110. Thus, the mobile devices 502-506 that communicate with entities reachable via the IP network 102 may have to transmit communications a thousand miles to reach the PDN gateway 112 and possibly another thousand miles to reach a destination. The example local PDN gateway 508 is deployed relatively physically close to the content server 510, thereby reducing communication propagation times between the mobile devices 502-506 and the content server 510.

In the illustrated example, the local PDN gateway 508 may include many of the functions of the PDN gateway 112, as described in conjunction with FIG. 1. However, because the local PDN gateway 508 processes relatively fewer communications targeted only for the content server 510

(and/or a group of physically close content servers), the example local PDN gateway 508 may have relatively lower processing capacity compared to the PDN gateway 112. In this example, the example serving gateway 110 receives communications from the mobile devices 502-504, determines the communications are addressed to the content server 510, and routes the communications to the local PDN gateway 508. Similarly, the example latency VPMN 204 within the serving gateway 110 routes communications from the mobile device 506 with a destination of the content server 510 to the latency VPMN 204 within the local PDN gateway 508.

In some instances, the latency VPMN 204 hosted on the local PDN gateway 508 may be configured with a protocol to offload processing functions from the mobile device 506 for applications retrieving content from the content server 510. Thus, the latency VPMN 204 hosted on the local PDN gateway 508 reduces latency with the mobile device 506 by processing relatively high volumes of data and/or communications from the content server 510 and transmitting the results of the processing to the mobile device 506. In examples where the content server 510 hosts a network gaming application, the latency VPMN 204 hosted by the local PDN gateway 508 may be configured with in-band controls to provide a equally fine granular level of latency between communicatively coupled mobile devices.

Figure 6:
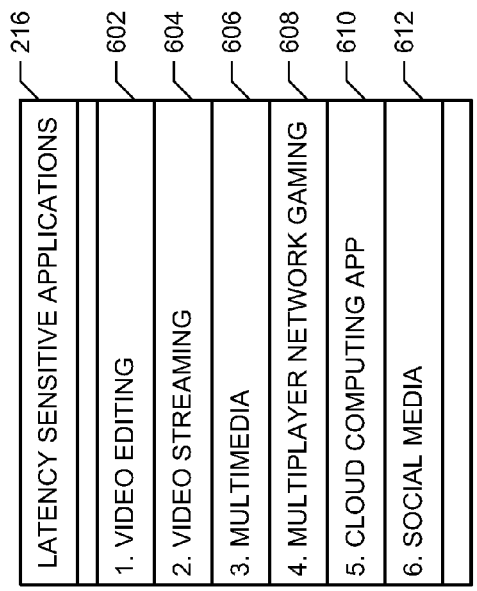
FIG. 6 illustrates identifiers of example latency sensitive applications.

FIG. 6 shows the example latency routing rules 216 of FIGS. 2-5 that include identifiers of latency sensitive applications 602-612 specified by, for example, the client administrator 122 of FIG. 1. The example identifiers of latency sensitive applications 602-612 include descriptions of applications and/or communications associated with applications that the VPMN controller 116, the latency processor 130, and/or the network elements 108-112 and 210-214 use to identify latency sensitive communications. For example, the PCRF server 214 of FIGS. 2-5 may communicate the latency routing rules 216 or, alternatively, each of the identifiers of latency sensitive applications 602-612 to, for example, the VPMNs 202 and 204 and/or the other network elements 108-112, 210, and 212. In other examples, the VPMN controller 116 and/or the latency processor 130 may transmit the latency routing rules 216 and/or the identifiers of latency sensitive applications 602-612.

In the example of FIG. 6, the video editing application identifier 602 corresponds to a latency sensitive application that utilizes hosts (e.g., the network elements 108-112 and 210-214) to offload data intensive video processing. The example video streaming application identifier 604 and the multimedia video identifier 606 correspond to latency sensitive applications that utilize relatively high volumes of data and/or communications. The example multiplayer network gaming application identifier 608 corresponds to a latency sensitive application that plays a game through a network. The example cloud computing application identifier 610 corresponds to a latency sensitive application that uses remote data centers and/or servers to store data, operate a service, and/or any other cloud computing application. The example social media application identifier 612 corresponds to a latency sensitive application that accesses one or more social media websites to access and/or create content.

The example identifiers of latency sensitive applications 602-612 are shown for purposes of illustration. In other examples, the latency routing rules 216 may include additional, fewer, and/or different types of latency sensitive applications. Additionally, the latency routing rules 216 may specify which latency VPMN a mobile device is to be migrated based on a type of latency sensitive application.

The example latency routing rules 216 of the illustrated example may also use priorities as to which communications associated with which latency sensitive applications are to be migrated to a latency VPMN first. The priorities may be specified by, for example, the client administrator 122 of FIG. 1. For example, a latency VPMN hosted by the network elements 108-112 and 210-214 has a certain amount of bandwidth. In these instances, only mobile devices operating relatively higher priority latency sensitive applications may be communicatively coupled to the latency VPMN.

Figure 7:
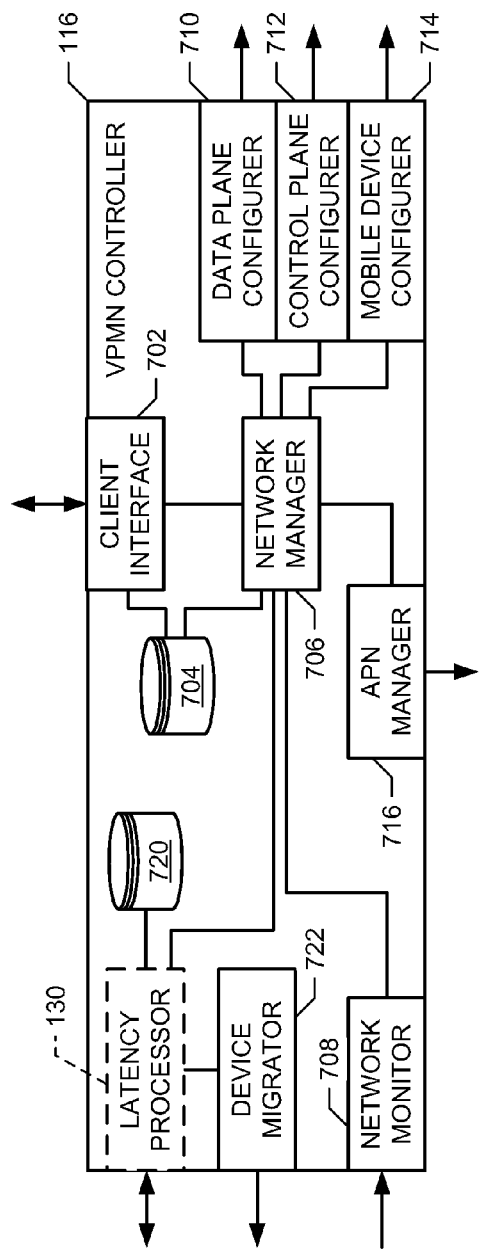
FIG. 7 illustrates a functional diagram of the example virtual private mobile network controller and the latency processor of FIGS. 1-5.

FIG. 7 shows a functional diagram of the example VPMN controller 116 and the latency processor 130 of FIG. 1. The example VPMN controller 116 and/or the latency processor 130 may be included within a controller, server, processor, and/or computing center of a wireless mobile network provider. In some examples, the VPMN controller 116 and/or the latency processor 130 may be included within a data plane and/or control plane allocation controller of a wireless mobile network provider.

To receive requests and/or latency routing rules from clients (e.g., the client administrator 122 of FIG. 1) for VPMNs, the example VPMN controller 116 of the illustrated example includes a client interface 702 (e.g., the MaaS portal 120). The example client interface 702 provides a framework that enables clients to request a VPMN by selecting, for example, bandwidth requirements, geographic location, wireless spectrum frequencies, and/or which types of network elements are to host a VPMN. The request may also include client administrative information including billing information, profile information, network addresses, etc. In some examples, the client interface 702 may be a web-based interface that provides options and/or templates that clients can select to request a VPMN and/or specify latency sensitive applications. In other examples, the client interface 702 may include a phone-request system and/or a form request system.

After receiving a request from a client for a VPMN, the client interface 702 creates a client account that includes the information provided by the client. The client interface 702 stores the client account to a client records database 704. In some examples, the HSS 212 of FIGS. 2-4 may access the client records database 704 for client profile information for security authentication and/or authorization. The client records database 704 may be implemented by Electronically Erasable Programmable Read-Only Memory (EEPROM), Random Access Memory (RAM), Read-Only Memory (ROM), and/or any other type of memory.

The example client interface 702 may also assign one or more APNs to a VPMN requested by a client. The client interface 702 may store the APN(s) to the client account in the client records database 704. Additionally, the client interface 702 may transmit the APN(s) and/or any information associated with a newly created VPMN to the client.

To manage the creation and/or management of VPMNs, the VPMN controller 116 of FIG. 7 includes a network manager 706. The example network manager 706 uses the information provided by the client to create a VPMN. The example network manager 706 may also receive requests from the latency processor 130 to create a latency VPMN (e.g., the latency VPMN 204). To determine which network elements will host the VPMN, the network manager 706 receives a status of the wireless mobile network 104 via a network monitor 708.

The example network monitor 708 of the illustrated example scans the wireless mobile network 104 to determine network traffic conditions, bandwidth usage, and/or any QoS issues. In some examples, the network monitor 708 may maintain a history of network performance based on detected network conditions. The network monitor 708 may also determine an amount of available capacity and/or bandwidth within network elements (e.g., the network elements 108-112, 210-214, 402, and 404 of FIGS. 1-4).

The example network manager 706 of FIG. 7 uses the information from the network monitor 708 to identify available network elements to host a VPMN. The network manager 706 may also use information associated with other client VPMNs stored in the client records database 704 to determine if there is available capacity within the identified network elements based on already licensed VPMN usage. If there is no additional capacity for another VPMN, the network manager 706 identifies other available network elements.

For each of the network elements with available capacity, the network manager 706 allocates a portion of a control plane and/or a data plane. Allocating a data plane may include allocating a portion of a wireless spectrum of one or more eNodeBs for a VPMN. The network manager may also allocate a data plane by partitioning a portion of a switch within for example, the gateways 110 and 112 for network traffic associated with a VPMN. The network manager 706 may further allocate a data plane by designating certain interfaces of a switch and/or a router for a VPMN. After allocating data plane space to network elements, the network manager 706 sends an instruction to a data plane configurer 710 to configure a data plane on the allocated portions of the identified network elements.

The example network manager 706 allocates a control plane by, for example, designating a portion of IP address space that is to be associated with a VPMN. The portion of the IP address space may be referenced to an assigned APN. The example network manager 706 may also partition a control plane of a network element by virtualizing functionality of the network element specifically designated for a VPMN. The example network manager 706 may further allocate a control plane by partitioning portions of databases and/or servers (e.g., the MME 210, HSS 212, and/or the PCRF server 214) to store information associated with clients and/or subscribing customers of a VPMN and/or latency routing rules. After allocating control plane space to network elements, the network manager 706 sends an instruction to a control plane configurer 712 to configure a control plane on the allocated portions of the identified network elements.

By allocating portions of a data plane and/or a control plane, the example network manager 706 may also specify a virtual circuit (and/or other type of private path such as, for example, a MPLS path) to be implemented within a VPMN. To specify a virtual circuit, the network manager 706 identifies outgoing and/or incoming interfaces of the network elements associated with the VPMN and/or IP address space allocated to the VPMN. The example network manager 706 then links together the interfaces, routers, switches, interfaces, and/or connections based on the identified information to create the virtual circuit and updates routing and/or forwarding tables within the corresponding network elements. Thus, any communications associated with a VPMN are transmitted between the VPMN allocated portions of the network elements.

Additionally, the network manager 706 may determine if separate eNodeBs are to be used for each VPMN (as described in conjunction with FIG. 4). If multiple eNodeBs are to be utilized, the client interface 702 receives parameters associated with the eNodeB. The network manager 706 uses the parameters and/or an assigned APN to associate the VPMN to an eNodeB. A mobile device configurer 714 and/or an APN manager 716 may then configure the eNodeB to be communicatively coupled to one or more serving gateways that have partitioned space for the VPMN.

To configure a VPMN on a data plane of network elements, the example VPMN controller 116 of FIG. 7 includes the data plane configurer 710. The example data plane configurer 710 provisions a VPMN on portions of network elements identified by the network manager 706 and/or the latency processor 130. The example data plane configurer 710 may configure and/or provision a VPMN by designating, for example, frequencies of a wireless spectrum provided by an eNodeB for a VPMN.

Additionally, the data plane configurer 710 may designate portions of a server and/or a router (e.g., the gateways 110 and/or 112) for hosting the VPMN. The example data plane configurer 710 may also create a virtual circuit (e.g., MPLS path) for a VPMN by updating routing and/or forwarding tables of network elements based on information from the network manager 706. The example data plane configurer 710 may also dynamically change an amount of bandwidth and/or processing capacity provisioned for a VPMN based on instructions from the network manager 706.

For example, the network manager 106 may receive an indication from the network monitor 708 that a VPMN on a serving gateway is operating close to provisioned capacity. In this example, the network manager 106 may increase data plane space for the VPMN by instructing the data plane configurer 710 to provision additional interfaces, links, circuitry, and/or processing capacity of the serving gateway for the VPMN. Thus, the data plane configurer 710 enables a VPMN to be dynamically provisioned based on current, future, and/or predicted network traffic conditions.

To configure a VPMN on a control plane of network elements, the example VPMN controller 116 of FIG. 7 includes the control plane configurer 712. The example control plane configurer 710 provisions a VPMN on portions of network elements identified by the network manager 706 and/or the latency processor 130. The example control plane configurer 710 may configure a VPMN in a control plane of a network element by updating routing and/or forwarding tables with an IP address space and/or an APN for communications associated with a VPMN.

The example control plane configurer 712 provisions a control plane for a latency VPMN (e.g., the latency VPMN 204 of FIGS. 2-5) by configuring latency reducing protocols and/or analysis tools within the latency VPMN. The protocols and/or analysis tools enable the latency VPMN to improve latency, equality latency, and/or offload processing from mobile devices. The example control plane configurer 712 may also deploy algorithms, programs, and/or routines to collect information about the latency sensitive communications and/or applications for statistical and/or tracking analysis.

Further, the control plane configurer 712 may provision portions of a database storing client profile information and/or subscriber profile information so that the information is only accessible via a VPMN. In other examples, the control plane configurer 712 may update network elements with specialized service information for a VPMN. Thus, the control plane configurer 712 ensures that client and/or subscribing customer information associated with different VPMNs can be stored on the same network element so that the information is only accessible to entities and/or network elements associated with the corresponding VPMN.

To update mobile devices with information, thereby enabling the mobile devices to communicatively couple to a VPMN, the example VPMN controller 116 of FIG. 7 includes a mobile device configurer 714. The example mobile device configurer 714 may install functionality, codes, connectivity, etc. to a mobile device (e.g., the mobile device 402) to enable the mobile device to connect to a VPMN. For example, the mobile device configurer 714 may transmit an APN associated with a VPMN to corresponding mobile devices. The example mobile device configurer 714 may also transmit mobile device information and/or customer profile information to network elements to enable the network elements to authorize and/or authenticate a mobile device connecting to a VPMN. In other examples, a client (e.g., an MVNO) may pre-configure a mobile device with functionality to connect to a VPMN prior to providing the mobile device to a subscribing customer.

To propagate an APN assigned to a VPMN to network elements, the example VPMN controller 116 of the illustrated example includes an APN manager 716. The example APN manager 716 receives an APN assigned to a VPMN by the network manager 706 and transmits the APN to network elements that have a portion of a control and/or a data plane partitioned for an associated VPMN. For example, the APN manager 716 may transmit an APN to the HSS 212 and/or the MME 210, thereby enabling the MME 210 to determine to which VPMN on the serving gateway 110 communications from a mobile device are to be routed. Additionally or alternatively, the APN manager 716 may transmit an assigned APN to the APN DNS servers 124 and 126 of FIG. 1. In examples where more than one APN is associated with a client, the APN manager 716 transmits the appropriate APN to network elements. Further, the APN manager 716 may update APNs stored on the network elements as the APNs are updated by the VPMN controller 116.

To provision a latency VPMN within, for example, the wireless mobile network 104, the example VPMN controller 116 of FIG. 7 includes the latency processor 130. The example latency processor 130 identifies and/or receives indications of latency sensitive communications and determines which corresponding mobile device is to be communicatively coupled to which latency VPMN. While the example latency processor 130 is included within the VPMN controller 116, in other examples, the latency processor 130 may be external and communicatively coupled to the VPMN controller 116. For example, the latency processor 130 may be implemented within a latency VPMN hosted by, for example, the network elements 108-112 and 210-214.

In some examples, the latency processor 130 monitors communications within, for example, the wireless mobile network 104 for latency sensitive communications and/or latency sensitive applications accessing the network 104. In other examples, the example latency processor 130 may coordinate the monitoring of communications between, for example, the network elements 108-112 and 210-214 and/or VPMNs provisioned on the network elements 108-112 and 210-214. The example latency processor 130 accesses a latency rules database 720 to identify which communications are latency sensitive within the network elements 108-112 and 210-214.

The example latency rules database 720 stores latency routing rules (e.g., the latency routing rules 216) that include identifiers of latency sensitive applications and/or communications. The latency rules database 720 may also store latency routing rules that specify profiles of communication patterns that indicate high volume data transfers and/or latency sensitive communications. In some examples, the latency rules database 720 may be included within, for example, the PCRF server 214 of FIGS. 2-5. The latency rules database 720 stores records of latency sensitive communications and/or records identifying which mobile devices are associated with one or more latency sensitive communications. Network operators and/or the example latency processor 130 may use these records to create additional latency routing rules and/or generate network statistics. The latency rules database 720 may be implemented by Electronically Erasable Programmable Read-Only Memory (EEPROM), Random Access Memory (RAM), Read-Only Memory (ROM), and/or any other type of memory.

After detecting latency sensitive communications and/or receiving an indication of latency sensitive communications from, for example, the VPMN 202 of FIGS. 2-4, the example latency processor 130 of FIG. 7 determines if a latency VPMN is provisioned within the example network elements 108-112 and 210-214. If a latency VPMN needs to be provisioned, the example latency processor 130 provisions a latency VPMN. To provision the latency VPMN, the example latency processor 130 may instruct the network manager 706 to identify available capacity within the network elements 108-112 and 210-214 and allocate control and/or data plane space for the latency VPMN. The example network manager 706 then coordinates the creation of the latency VPMN with the configurers 710-714. The example network manager 706 may also instruct the APN manager 716 to send an identified mobile device an APN of the newly provisioned VPMN. In other examples, the example latency processor 130 may provision a latency VPMN within the network elements 108-112 and 210-214.

The example latency processor 130 selects which latency VPMN to communicatively couple a mobile device based on a type of latency sensitive communications. For example, the latency processor 130 may communicatively couple a mobile device operating a network gaming application to a latency VPMN with specific in-band control protocols to reduce game lag. In other examples, the latency processor 130 may determine a priority for mobile devices to be communicatively coupled to a latency VPMN based on a type of application associated with the communications, a service level agreement associated with the mobile device, and/or any other criteria specified by a client network administrator.

Further, for each provisioned latency VPMN, the example latency processor 130 may configure, transmit and/or install protocols, routines, algorithms, analysis tools. For example, the example latency processor 130 may configure a latency VPMN associated with data intensive processing functions with protocols for processing the data within the latency VPMN hosted by, for example, the network elements 108-112 and 210-214, which have relatively more processing capacity than a mobile device. These protocols may include, for example, offloading routines to synchronize a mobile device to results of processing.

The example latency processor 130 may also provision a latency VPMN on local PDN gateways (e.g., mobility data centers). In these examples, the latency processor 130 only provisions a latency VPMN on a local PDN gateway in response to requests to access relatively physically close content servers and/or data centers. To select the local PDN gateway, the example latency processor 130 may determine a geographic location of a destination address of the latency sensitive communications and determine which local PDN gateway is relatively close. In this manner, the example latency processor 130 only provisions a latency VPMN when there is demand, thereby conserving allocated portions of local PDN gateways when there is reduced and/or no demand. In other examples, the latency processor 130 may provision a latency VPMN on frequently accessed and/or utilized local PDN gateways.

In examples where a latency VPMN is already provisioned, the example latency processor 130 instructs a device migrator 722 to communicatively couple a mobile device (e.g., the mobile device 224 of FIGS. 2 and 3) to the latency VPMN. The example device migrator 722 may use, for example, over the air programming via the serving gateway 110, the HSS 212, the MME 210 and/or the eNodeB 108 to provision a SIM card of a mobile device to communicatively couple the mobile device to a latency VPMN. In this example, the device migrator 722 may determine an APN to provision the SIM card by accessing the APN manager 716. In other examples, the device migrator 722 may determine an APN for the latency VPMN from a network provider and/or a client administrator. In other examples, the example latency processor 130 may instruct the APN manager 716 to communicatively couple a mobile device to a latency VPMN.

The example device migrator 722 of FIG. 7 migrates mobile devices from a latency VPMN after the latency processor 130, a latency VPMN, and/or the network elements 108-112 and 210-214 determine that the mobile devices are no longer receiving and/or transmitting latency sensitive communications. The example device migrator 722 may wait a predefined time period after latency sensitive communications cease prior to migrating the mobile devices. In these examples, the device migrator 722 may send an APN to a non-latency VPMN and/or an APN to the network elements 108-112 and 210-214. In other examples, the device migrator 722 may instruct the APN manager 716 to migrate the mobile device.

While the example VPMN controller 116 and/or the latency processor 130 has been illustrated in FIG. 7, one or more of the servers, platforms, interfaces, data structures, elements, processes and/or devices illustrated in FIG. 7 may be combined, divided, re-arranged, omitted, eliminated and/or implemented in any way. Further, the example client interface 702, the example client resource database 704, the example network manager 706, the example network monitor 708, the example data plane configurer 710, the example control plane configurer 712, the example mobile device configurer 714, the example APN manager 716, the example latency processor 130, the example latency rules database 720, the example device migrator 722, and/or more generally, the example VPMN controller 116 may be implemented by hardware, software, firmware and/or any combination of hardware, software and/or firmware. Thus, for example, any of the example client interface 702, the example client resource database 704, the example network manager 706, the example network monitor 708, the example data plane configurer 710, the example control plane configurer 712, the example mobile device configurer 714, the example APN manager 716, the example latency processor 130, the example latency rules database 720, the example device migrator 722 and/or more generally, the example VPMN controller 116 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example client interface 702, the example client resource database 704, the example network manager 706, the example network monitor 708, the example data plane configurer 710, the example control plane configurer 712, the example mobile device configurer 714, the example APN manager 716, the example latency processor 130, the example latency rules database 720, and/or the example device migrator 722 are hereby expressly defined to include a computer readable medium such as a memory, DVD, CD, etc. storing the software and/or firmware. Further still, the example VPMN controller 116 and/or the latency processor 130 may include one or more elements, processes and/or devices in addition to, or instead of, those illustrated in FIG. 7, and/or may include more than one of any or all of the illustrated elements, processes and devices.

Figure 8A:
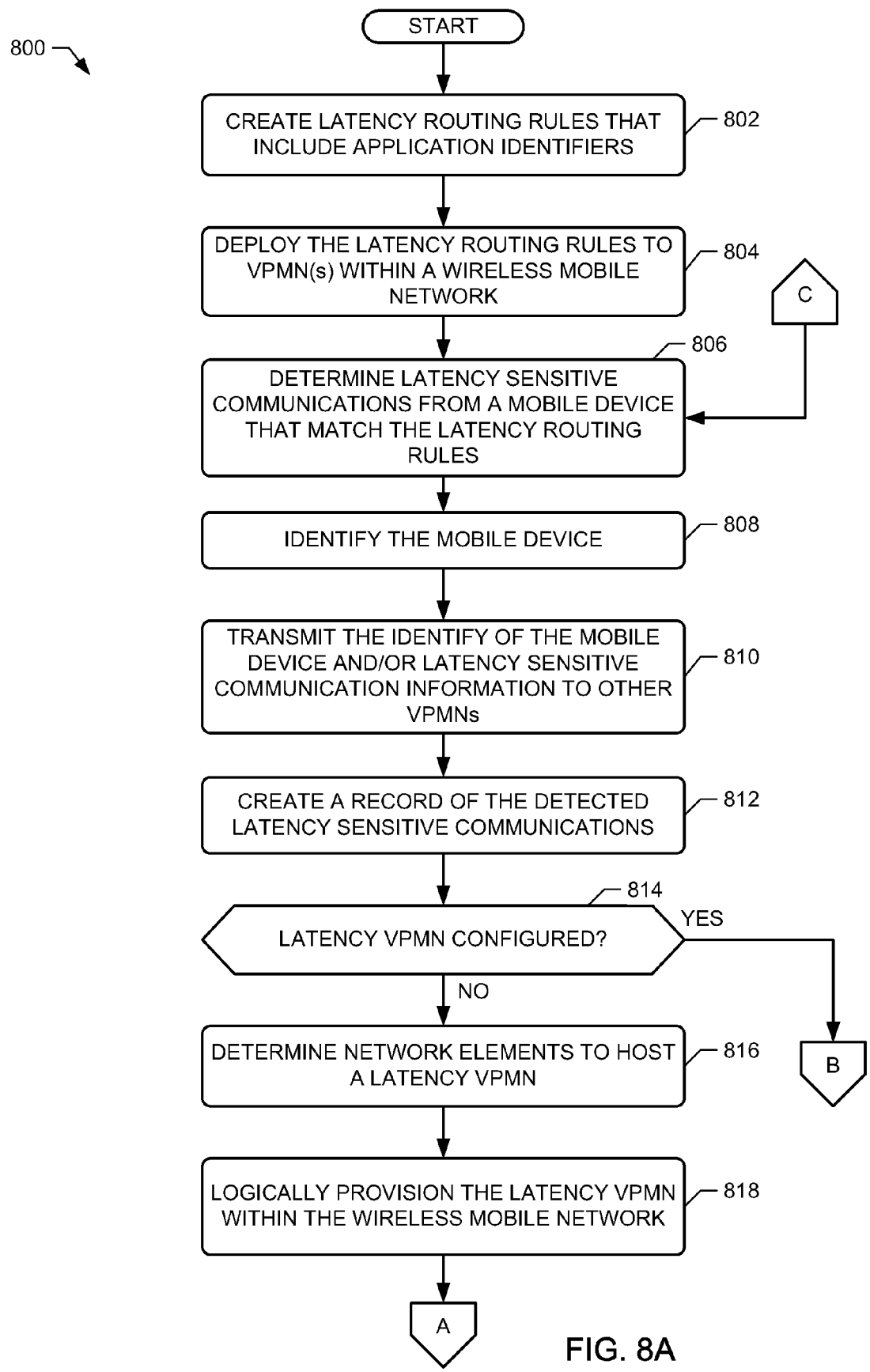
FIGS. 8A and 8B are flowcharts representative of example machine-accessible instructions, which may be executed to implement the virtual private mobile network controller and/or the latency processor of FIGS. 1-7.
Figure 8B:
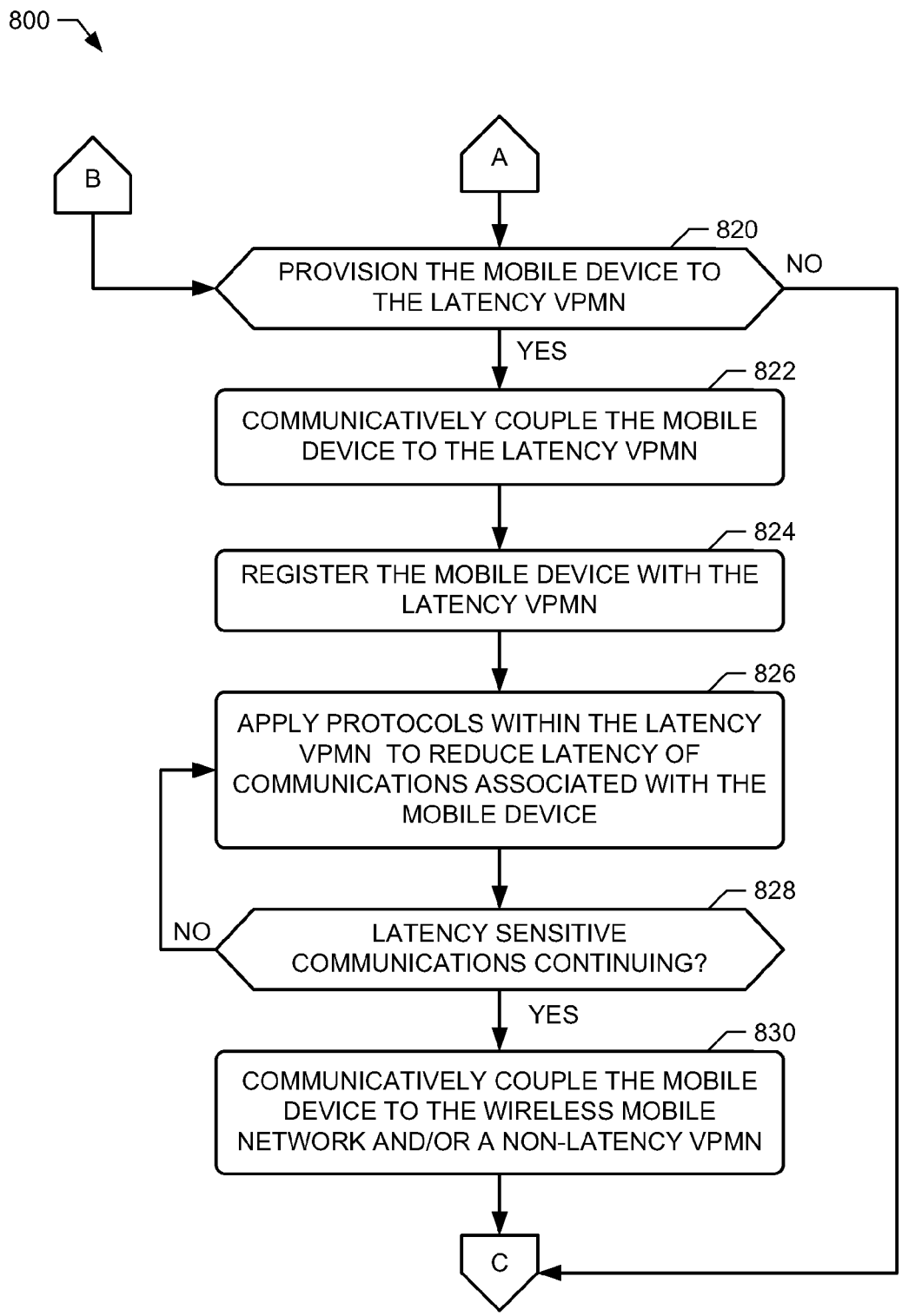

FIGS. 8A and 8B depict example flow diagrams representative of processes that may be implemented using, for example, computer readable instructions that may be used to configure virtual private mobile networks to reduce latency. The example processes of FIGS. 8A and 8B may be performed using a processor, a controller and/or any other suitable processing device. For example, the example processes of FIGS. 8A and 8B may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. The example processes of FIGS. 8A and 8B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 8A and 8B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 8A and 8B may be implemented manually or as any combination(s) of any of the foregoing techniques, for example, any combination of firmware, software, discrete logic and/or hardware. Further, although the example processes of FIGS. 8A and 8B are described with reference to the flow diagrams of FIGS. 8A and 8B, other methods of implementing the processes of FIGS. 8A and/or 8B may be employed. For example, the order of execution of the blocks may be changed, and/or some of the blocks described may be changed, eliminated, sub-divided, or combined. Additionally, any or all of the example processes of FIGS. 8A and 8B may be performed sequentially and/or in parallel by, for example, separate processing threads, processors, devices, discrete logic, circuits, etc.

The example process 800 of FIGS. 8A and 8B provisions a VPMN to reduce latency by, for example, the VPMN controller 116 and/or the latency processor 130 of FIGS. 1-7. The example process 800 begins with the example latency processor 130 generating latency routing rules that include identifiers of latency sensitive applications and/or communications (block 802). The latency routing rules may also specify profiles of latency sensitive communications. The latency routing rules may be specified by, for example, the client administrator 122 of FIG. 1. In other examples, the latency processor 130 may generate the latency routing rules from collected latency sensitive communication information stored within the latency rules database 720 of FIG. 7. After generating the latency routing rules, the example latency processor 130 deploys (e.g., transmits) the latency routing rules (e.g., the latency routing rules 216) to VPMN(s) within, for example, the wireless mobile network 104 (block 804). Additionally or alternatively, the latency processor 130 may transmit the latency routing rules to the PCRF server 214 and/or the other network elements 108-112, 210, and 212.

The example process 800 continues by the example latency processor 130 determining latency sensitive communications (and/or latency sensitive applications) from a mobile device that match at least one identifier and/or profile within the latency routing rules (block 806). The example latency processor 130 may also determine the latency sensitive communications based on a volume of data associated with the communications. The example latency processor 130 then identifies a mobile device associated with the latency sensitive communications (block 808). The example latency processor 130 may then transmit the identity of the mobile device and/or latency sensitive communication and/or application information to other VPMNs within the wireless mobile network 104 (block 810). Further, the latency processor 130 creates a record of the latency sensitive communications and stores the record to the latency rules database 720 (block 812).

The example latency processor 130 next determines if a latency VPMN is provisioned (block 814). If a latency VPMN is not provisioned for the latency sensitive communications, the example latency processor 130 and/or the network manager 706 of FIG. 7 identifies network elements (e.g., the network elements 108-112 and 210-214) to host a latency VPMN (block 816). The example latency processor 130 and/or the configurers 710-714 then logically provision the latency VPMN within the wireless mobile network 104 (block 818).

The example process 800 of FIG. 8B continues with the example device migrator 722 determining if the mobile device is to be communicatively coupled to the latency VPMN (block 820). Additionally, if the latency VPMN is already deployed (block 814), the example device migrator 722 determines if the mobile device is to be communicatively coupled to the latency VPMN. The example latency processor 130 determines if the mobile device is to be migrated to the latency VPMN based on a type of the application associated with the latency sensitive communications, a priority associated with the communications, a volume of data associated with the communications, and/or any other criteria specified by, for example, the client administrator 122. If the mobile device is not to be communicatively coupled to the latency VPMN, the example latency processor 130 returns to determining latency sensitive communications within the wireless mobile network 104 (block 806). Additionally or alternatively, VPMNs and/or the network elements 108-112 and 210-214 monitor for latency sensitive communications while the example latency processor 130 communicatively couples identified mobile devices to the latency VPMN.

If the mobile device is to be communicatively coupled to the latency VPMN, the example device migrator 722 and/or the APN manager 716 communicatively couples the mobile device to the latency VPMN by provisioning, for example, a corresponding SIM card with an APN of the latency VPMN (block 822). The example device migrator 722 and/or the APN manager 716 then register the mobile device with the latency VPMN (block 824). The example latency processor 130 and/or the latency VPMN then apply protocols and/or analysis tools to communications associated with the mobile device (block 826).

The example process 800 of FIG. 8B continues by the example latency processor 130 and/or the latency VPMN determining if the mobile device is continuing to receive and/or transmit latency sensitive communications (block 828). If the communications are continuing, the example latency processor 130 and/or the latency VPMN continue processing, routing, and/or analyzing communications from the mobile device (block 826). However, if the mobile device has stopped sending and/or receiving latency sensitive communications, the example device migrator 722 and/or the APN manager 716 communicatively couple the mobile device to a non-latency VPMN, a previously accessed VPMN, and/or the wireless mobile network 104 without a VPMN (block 830). The example latency processor 130 then monitors communications from the mobile device and/or other mobile devices to identify latency sensitive communications (block 806).

Figure 9:
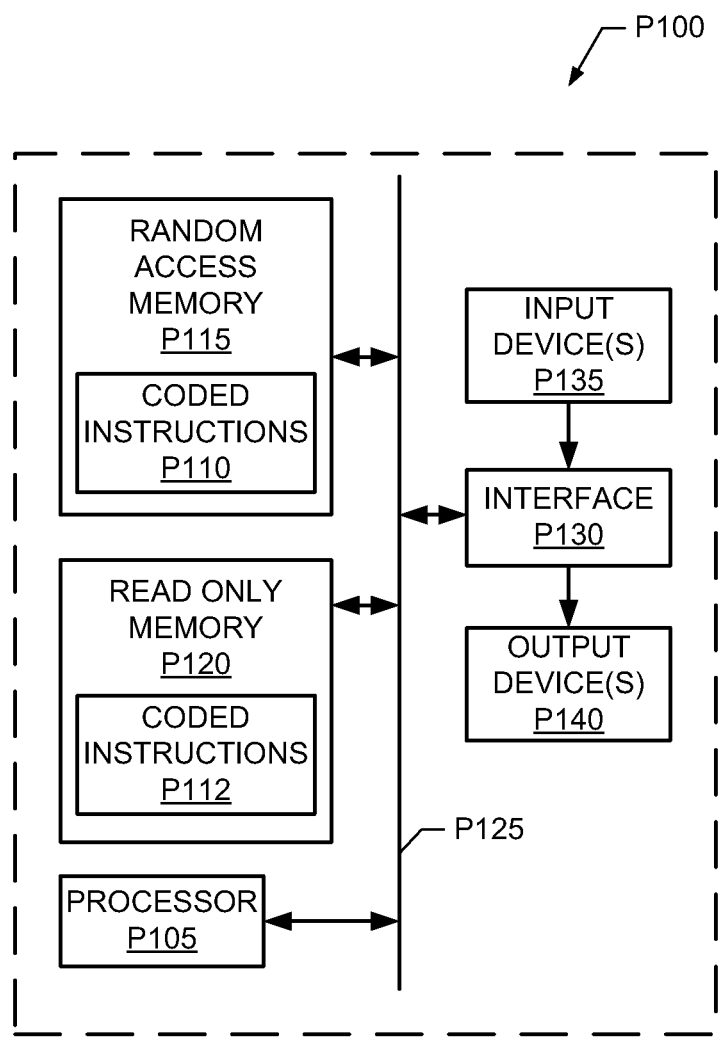
FIG. 9 is a schematic illustration of an example processor platform that may be used and/or programmed to execute the example processes and/or the example machine-accessible instructions of FIGS. 8A and/or 8B to implement any or all of the example methods, apparatus and/or articles of manufacture described herein.

FIG. 9 is a schematic diagram of an example processor platform P100 that may be used and/or programmed to implement the example client interface 502, the example client resource database 504, the example network manager 506, the example network monitor 508, the example data plane configurer 510, the example control plane configurer 512, the example mobile device configurer 514, the example APN manager 516, the example latency processor 130, the example latency rules database 720, the example device migrator 722 and/or more generally, the example VPMN controller 116 of FIGS. 1-7. For example, the processor platform P100 can be implemented by one or more general-purpose processors, processor cores, microcontrollers, etc.

The processor platform P100 of the example of FIG. 9 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 8A and/or 8B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example resource client database 704 and/or the latency rules database 720 of FIG. 7.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to configure a virtual private mobile network, the method comprising:
   determining, at a wireless mobile network, that communications from a mobile device communicatively coupled to the wireless mobile network are latency sensitive communications by comparing the communications to a latency routing rule;
   in response to determining that the communications are latency sensitive communications,
      allocating a portion of a control plane of a network element to host a first virtual private mobile network by associating a portion of an Internet Protocol address space with the first virtual private mobile network, referencing the portion of the Internet Protocol address space to a first access point name, and virtualizing functionality of the network element;
      allocating a portion of a data pane of the network element to host the first virtual private mobile network by configuring a second aspect of the network element, the network element being a part of the wireless mobile network; and
   migrating the mobile device from a second virtual private mobile network to the first virtual private mobile network to reduce latency of the latency sensitive communications of the mobile device.

2. A method as defined in claim 1, wherein a client requests the wireless mobile network to process communications associated with latency sensitive applications separate from communications that are determined to be not latency sensitive.

3. A method as defined in claim 1, wherein the latency sensitive communications include communications generated by at least one of a gaming application, a video editing application, a video streaming application, an audio streaming application, a cloud computing application, and a social network application.

4. A method as defined in claim 1, wherein the latency sensitive communications are communications with a content server which occur via the first virtual private mobile network, the content server hosted by a local packet data network gateway within the wireless mobile network and proximate to the content server.

5. A method as defined in claim 1, further including at least one of: a) performing content routing via a virtual tunnel between the mobile device and a content server; b) implementing network in-band controls to equalize latency between mobile devices communicatively coupled together to host a network gaming application; and c) implementing network protocols to offload mobile device processing to the network element hosting the first virtual private mobile network.

6. A method as defined in claim 1, wherein the migrating of the mobile device to the first virtual private mobile network includes using over the air programming to provision a subscriber identity module card associated with the mobile device with an access point name corresponding to the first virtual private mobile network.

7. A method as defined in claim 1, further including configuring the second virtual private mobile network to reduce latency for a first type of latency sensitive communications, the first virtual private mobile network being configured to reduce latency for a second type of latency sensitive communications.

8. A method as defined in claim 1, wherein the allocating of the portion of the control plane of the network element further includes partitioning a portion of a server to store information associated with a client of the first virtual private mobile network.

9. A method as defined in claim 1, wherein the configuring of the second aspect of the network element includes at least one of: a) allocating a portion of a wireless spectrum of one or more eNodeBs to the first virtual private mobile network; b) partitioning a portion of a switch in the network element for network traffic associated with the first virtual private mobile network; c) designating a first interface of the switch in the network element for the first virtual private mobile network; and d) designating a second interface of a router in the network element for the first virtual private mobile network.

10. A wireless mobile network including:
   a processor; and
   a memory having computer readable instructions stored therein which, when executed, cause the processor to perform operations including:
      determining that communications from a mobile device communicatively coupled to the wireless mobile network are latency sensitive communications by comparing the communications to a latency routing rule;

in response to determining that the communications are latency sensitive communications, allocating a portion of a control plane of a network element to host a first virtual private mobile network by associating a portion of an Internet Protocol address space with the first virtual private mobile network, referencing the portion of the Internet Protocol address space to a first access point name, and virtualizing functionality of the network element;

allocating a portion of a data plane of the network element to host the first virtual private mobile network by configuring a second aspect of the network element, the network element being a part of the wireless mobile network; and migrating the mobile device from a second virtual private mobile network to the first virtual private mobile network to reduce latency of the latency sensitive communications of the mobile device.

11. A network as defined in claim 10, wherein the mobile device is communicatively coupled to an un-virtualized portion of the wireless mobile network prior to coupling the mobile device to the first virtual private mobile network.

12. A network as defined in claim 10, wherein the operations further include accessing a notification from the network element within the wireless mobile network identifying the communications associated with the mobile device as latency sensitive.

13. A network as defined in claim 10, wherein the operations further include provisioning the virtual private mobile network by: determining the latency sensitive communications have a destination address of a content server; determining a local packet data network gateway that is physically close to the content server; and provisioning the first virtual private mobile network on the local packet data network gateway.

14. A network as defined in claim 10, wherein the operations further include: determining the latency sensitive communications have a destination address corresponding to a mobility data center; provisioning the virtual private mobile network on the mobility data center; and transferring processing functions of a latency sensitive, application associated with the latency sensitive communications to the mobility data center.

15. A network as defined in claim 10, wherein the operations further include implementing routing protocols and forwarding tables to reduce latency of communications.

16. A tangible computer readable medium comprising instructions which, when executed, cause a processor of a wireless mobile network to perform operations including:

determining that a communication from a mobile device communicatively coupled to the wireless mobile network is a latency sensitive communication by comparing the communications to a latency routing rule;

in response to determining that the communication is a latency sensitive communication, allocating a portion of a control plane of a network element to host a first virtual private mobile network by associating a portion of an Internet Protocol address space with the first virtual private mobile network, referencing the portion of the Internet Protocol address space to a first access point name, and virtualizing functionality of the network element;

allocating a portion of a data plane of the network element to host the first virtual private mobile network by configuring a second aspect of the network element to host the first virtual private mobile network, the network element being a part of the wireless mobile network; and migrating the mobile device from a second virtual private mobile network to the first virtual private mobile network to reduce latency of the latency sensitive communication of the mobile device.

17. A tangible computer readable medium as defined in claim 16, wherein the operations further include configuring the first virtual private mobile network to reduce latency by implementing network in-band controls to equalize latency between mobile devices communicatively coupled together that are hosting a network gaming application.

18. A tangible computer readable medium as defined in claim 16, wherein the operations further include configuring the first virtual private mobile network to reduce latency by implementing network protocols to offload mobile device processing to the network element hosting the first virtual private mobile network.

19. A tangible computer readable medium as defined in claim 16, wherein the operations further include configuring the first virtual private mobile network to reduce latency by performing content routing via a network tunnel between the mobile device and a destination.

* * * * *